United States Patent
Bergström et al.

(10) Patent No.: US 11,375,482 B2
(45) Date of Patent: Jun. 28, 2022

(54) METHODS OF SIGNALING SUPPLEMENTARY ACTIVITY CONFIGURATION FOR LEAN CARRIER OPERATION

(71) Applicant: Telefonaktiebolaget LM Ericsson (publ), Stockholm (SE)

(72) Inventors: Mattias Bergström, Sollentuna (SE); Muhammad Kazmi, Sundbyberg (SE); Santhan Thangarasa, Vällingby (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 18 days.

(21) Appl. No.: 16/766,576

(22) PCT Filed: Feb. 15, 2019

(86) PCT No.: PCT/SE2019/050140
§ 371 (c)(1),
(2) Date: May 22, 2020

(87) PCT Pub. No.: WO2019/160495
PCT Pub. Date: Aug. 22, 2019

(65) Prior Publication Data
US 2020/0367234 A1    Nov. 19, 2020

Related U.S. Application Data

(60) Provisional application No. 62/632,375, filed on Feb. 19, 2018.

(51) Int. Cl.
*H04W 72/04* (2009.01)
*H04W 76/28* (2018.01)
*H04L 5/00* (2006.01)

(52) U.S. Cl.
CPC ....... *H04W 72/0413* (2013.01); *H04L 5/0005* (2013.01); *H04L 5/0042* (2013.01);
(Continued)

(58) Field of Classification Search
CPC .................. H04W 72/0413; H04W 76/28
See application file for complete search history.

(56) References Cited

U.S. PATENT DOCUMENTS 10,171,215 B1 * 1/2019 Oroskar ................ H04L 5/0048
2018/0279272 A1 * 9/2018 Bhattad ................. H04L 5/005
(Continued)

OTHER PUBLICATIONS

PCT International Search Report and Written Opinion, dated May 23, 2019, for International Application No. PCT/SE2019/050140, 13 pages.
(Continued)

*Primary Examiner* — Jeffrey M Rutkowski
*Assistant Examiner* — Chae S Lee
(74) *Attorney, Agent, or Firm* — Sage Patent Group

(57) ABSTRACT

Methods and systems for signaling Supplementary Activity Configuration (SAC) for lean carrier operation are provided. According to one aspect, a method performed by a wireless device for lean carrier operation during which Cell-specific Reference Signals (CRSs) are transmitted by a base station using a reduced bandwidth during an inactive time of a Discontinuous Reception (DRX) mode of operation excluding a Warm Up (WU) period that occurs immediately before a DRX active time and a Cool Down (CD) period that occurs immediately after a DRX active time, comprises: determining a number M of subframes to comprise a WU period; determining a number N of subframes to comprise a CD period; and transmitting an indication of the determined numbers M and N to a base station currently serving the wireless device.

15 Claims, 14 Drawing Sheets

(52) U.S. Cl.
CPC .......... *H04L 5/0048* (2013.01); *H04L 5/0082* (2013.01); *H04W 72/048* (2013.01); *H04W 72/0426* (2013.01); *H04W 72/0446* (2013.01); *H04W 76/28* (2018.02)

(56) References Cited

U.S. PATENT DOCUMENTS

2019/0053280 A1* 2/2019 Rico Alvarino ...... H04L 5/0053
2020/0275522 A1* 8/2020 Chervyakov ............. H04L 5/10

OTHER PUBLICATIONS

Media Tek Inc., 3GPP TSG-RAN WG4 Meeting #86, R1-1801508, "Signalling Support for Network-Based CRS Interference Mitigation", Athens, Greece, Feb. 26-Mar. 2, 2018, 3 pages.

Intel Corporation, 3GPP TSG RAN4 Meeting #85 R4-1713853, "Further discussion on network based CRS-IM RRM", Reno Nevada USA, Nov. 27-Dec. 1, 2017, 6 pages.

Ericsson, 3GPP TSG RAN WG4 #84 R4-1711167, "Discussion on warm up and cool down period for cat-M1/M2 UEs under CRS muting," Berlin Germany, Aug. 21-25, 2017, 5 Pages.

Ericsson, 3GPP TSG RAN WG4 Meeting #86 R4-1802851, "On signalling support for network-based CRS interference mitigation for UE", Athens Greece, Feb. 26-Mar. 2, 2018, 2 Pages.

Huawei, 3GPP TSG RAN WG2 Meeting #93 R2-161166, "Summary of email discussion: [NBAH#04][NBIOT/Resume] RRC Functions for suspend—resume", St. Julian's Malta, Feb. 15-19, 2016, 26 Pages.

CATT, 3GPP TSG RAN WG2 Meeting #NR AH2 R2-1706409, "Periodic RNA update procedure", Qingdao China, Jun. 27-29, 2017, 4 Pages.

Extended European Search Report for European Patent Application No. 19753965.3 dated Sep. 30, 2021, 13 pages.

Nokia et al., 3GPP Tsg-Ran WG4 Meeting #85, R4-1713140, "Network Based CRS Mitigation", Reno, USA, Nov. 27, 27 Dec. 1, 2017, XP051375244,4 pages.

Ericsson, 3GPP Tsg-Ran WG4 Meeting #84, R4-1707780, "Crs Muting Impact on RRM Requirements for MTC", Berlin, Germany, Aug. 21-25, 2017, XP051320972,5 pages.

* cited by examiner

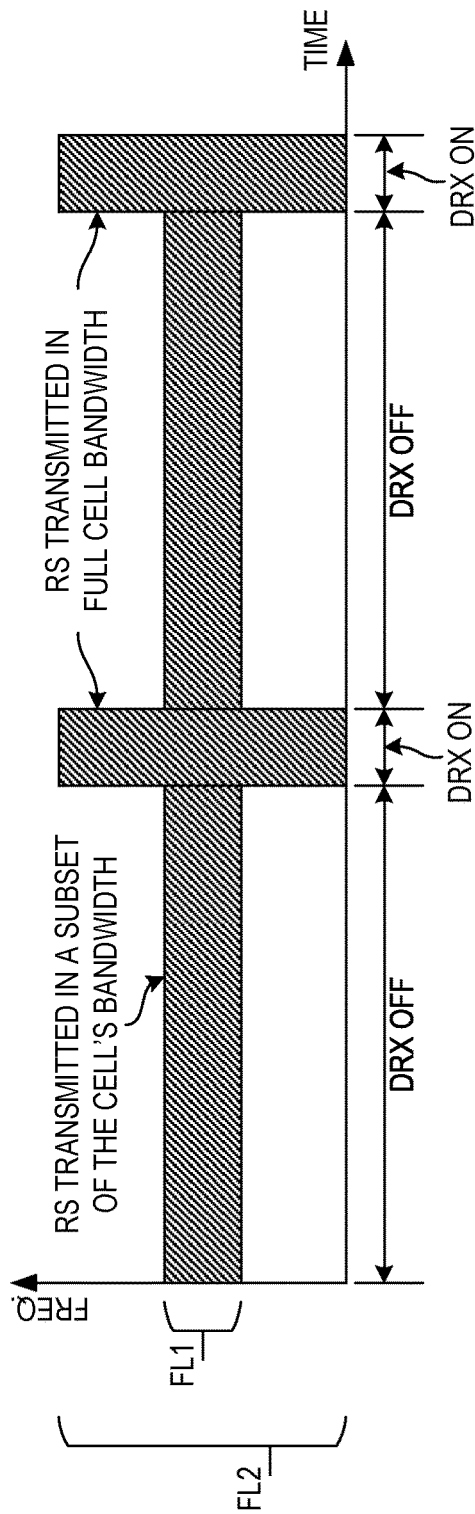
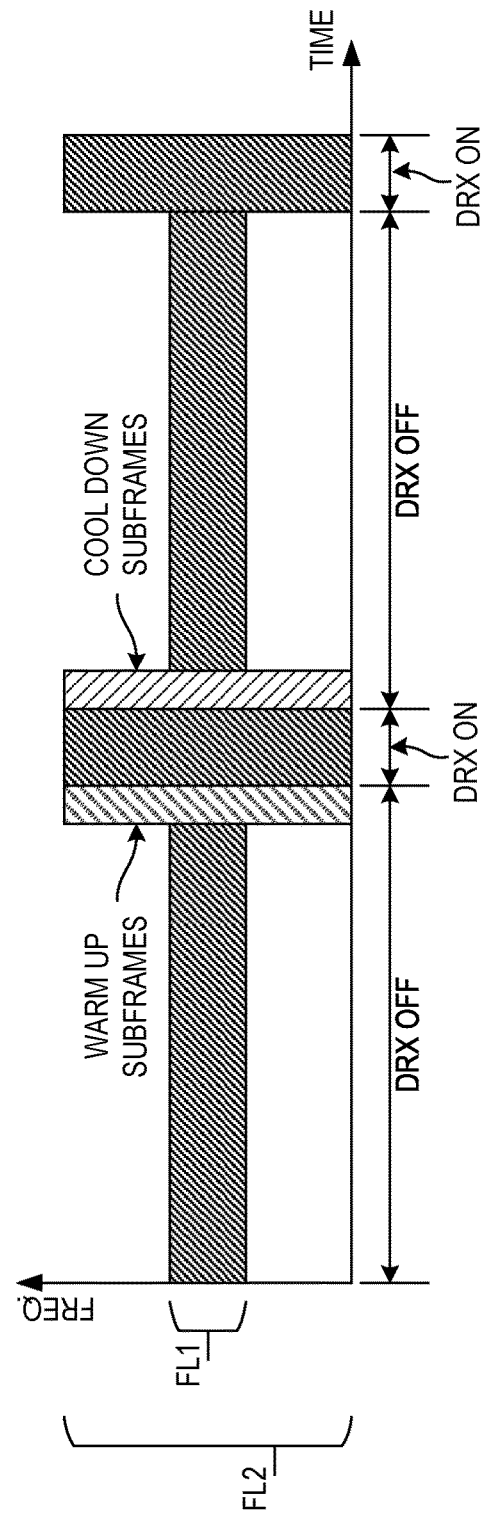

METHODS OF SIGNALING SUPPLEMENTARY ACTIVITY CONFIGURATION FOR LEAN CARRIER OPERATION

CROSS-REFERENCE TO RELATED APPLICATIONS

This application is a 35 U.S.C. § 371 national stage application for International Application No. PCT/SE2019/050140, entitled "METHODS OF SIGNALING SUPPLEMENTARY ACTIVITY CONFIGURATION FOR LEAN CARRIER OPERATION", filed on Feb. 15, 2019, which claims the benefit of U.S. provisional patent application Ser. No. 62/632,375, filed Feb. 19, 2018, the disclosures and contents of which are hereby incorporated by reference in their entireties.

TECHNICAL FIELD

This application relates to devices operating in cells that are configured for lean carrier operation. Specifically, this application relates to methods of signaling Supplementary Activity Configuration (SAC) for lean carrier operation.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Reference Signal (RS) Muting

Since Release 8 (Rel-8) in Third Generation Partnership Project (3GPP) Long Term Evolution (LTE) the Cell-specific Reference Signals (CRSs) are transmitted by the base station using full system bandwidth and in all Downlink (DL) subframes in a radio frame. The CRS is used by the User Equipment (UE) for several procedures. Examples of such procedures are time and/or frequency tracking or synchronization, channel estimation, radio link quality measurements, cell selection, cell reselection, etc.

But CRS are not used by the UE all the time. The continuous CRS transmission with full system bandwidth in one cell may cause interference at the UE operating in a neighboring cell. The CRS transmission also consumes base station power. In one example the CRS can be muted in a cell during an inactive time (e.g., OFF duration) of the Discontinuous Reception (DRX) mode while CRS are transmitted over full bandwidth during an active time (e.g., ON duration) of the DRX cycle.

FIG. 1 illustrates one example of a CRS muting operation, where "muted CRS" refers to a transmission of CRS using a reduced CRS bandwidth (e.g., over a central 6 Resource Blocks (RBs) within a cell bandwidth) during the inactive time of the DRX excluding Warm Up (WU) and Cool Down (CD) periods. The WU and CD periods typically occur during the inactive time, during which the CRS is transmitted over the full bandwidth of the cell or over a larger bandwidth. The WU periods occur before the active time of the DRX while the CD periods occur after the active time of the DRX, as shown in FIG. 1. In special cases, WU and/or CD periods can be zero. During at least the active time of the DRX, the CRS are transmitted over the full bandwidth or a larger bandwidth. This is also referred to herein as lean carrier operation, RS muting, or CRS muting, etc. The lean carrier operation is applied when DRX and/or enhanced DRX (eDRX) cycle is used.

DRX Cycle Operation

In LTE, the DRX cycle is used to enable a UE to save its battery. The DRX cycle is used in Radio Resource Control (RRC) idle state, but it can also be used in RRC connected state. Examples of lengths of DRX cycles currently used in RRC idle state include 320 Milliseconds (ms), 640 ms, 1.28 Seconds (s), and 2.56 s. Examples of lengths of DRX cycles currently used in RRC connected state may range from 2 ms to 2.56 s. The eDRX cycles are expected to be very long, e.g., ranging from several seconds to several minutes and even up to one or more hours. Typical values of eDRX cycles may be between 4-10 minutes.

The DRX cycle is configured by the network node and is characterized by the following parameters:

On duration: During the on duration of the DRX cycle, a timer called 'onDurationTimer,' which is configured by the network node, is running. This timer specifies the number of consecutive control channel subframes (e.g., Physical Downlink Control Channel (PDCCH), enhanced PDCCH (ePDCCH) subframe(s)) at the beginning of a DRX Cycle. It is also interchangeably referred to herein as DRX ON period. More specifically it is the duration in DL subframes that the UE has after waking up from DRX to receive control channel (PDCCH, ePDCCH). When the onDurationTimer is running, the UE is considered to be in DRX state of the DRX cycle.

DRX-inactivity timer: If the UE successfully decodes the control channel (e.g., PDCCH, ePDCCH, Machine-Type Communications (MTC) PDCCH (MPDCCH), Narrowband PDCCH (NPDCCH), etc.) during the ON duration, then the UE starts a DRX-inactivity timer (see below) and stays awake until its expiry. It specifies the number of consecutive control channel (e.g., PDCCH, ePDCCH) subframe(s) after the subframe in which a control channel (e.g., PDCCH) indicates an initial UL or DL user data transmission for this Medium Access Control (MAC) entity. It is also configured by the network node. When the DRX-inactivity timer is running, the UE is considered to be in non-DRX state, i.e., no DRX is used.

DRX active time: This time is the duration during which the UE monitors the control channel (e.g., PDCCH, ePDCCH, MPDCCH, NPDCCH, etc.). In other words, this is the total duration during which the UE receiver is active or awake. This includes the "on duration" of the DRX cycle, the time during which the UE is performing continuous reception while the inactivity timer has not expired, and the time the UE is performing continuous reception while waiting for a DL retransmission after one Hybrid Automatic Repeat Request (HARQ) Round-Trip Time (RTT). In contrast, during DRX inactive time the UE receiver is not active or awake and therefore the UE is not expected to monitor any control channel.

FIG. 2 illustrates the DRX operation with more detailed parameters in LTE. The embodiments are also applicable when the UE is configured with eDRX. The eDRX cycle has a DRX cycle length larger than a certain threshold (e.g., 5.12 seconds) and contains a Paging Transmission Window (PTW) within each eDRX cycle. The PTW contains one or more DRX cycles.

There currently exist certain challenge(s). In legacy systems, a wireless device can measure on RSs anytime in RRC_CONNECTED state or even RRC_IDLE state. It can also wake up any time prior to or post UE active periods (such as DRX ON) and measure on the RSs (e.g., CRS) since they are always transmitted over the entire system bandwidth. These measurements are typically used for preparing the receiver or transmitter for reception/transmission. They can also be used for performing time or frequency tracking, acquiring Automatic Gain Controller (AGC), adjusting Automatic Frequency Control (AFC), channel estimation, etc.

However, this is not possible when the RSs are muted or transmitted only within a certain part of the cell bandwidth, with a further complication that also (in some cases) the UE Radio Frequency (RF) bandwidth can be smaller than the cell bandwidth. This makes the legacy UE operation procedures less suitable under the RS muted scenarios. In the worst case, the UE may fail the corresponding procedure (e.g., timely cell detection) or may fail to meet the existing requirements when the network does not provide the RSs at least within the UE RF bandwidth. The UE also operates in different conditions and under a wide range of scenarios. This makes it even more challenging for the network to serve the UE efficiently and without any performance loss (e.g., loss in signal quality) under the lean carrier operation.

One solution that has been discussed to address this problem is to provide the UE with RS transmissions over a larger bandwidth (e.g., over the full bandwidth of the serving cell) compared to the muted bandwidth (e.g., over the central 6 RBs of the cell) in a few subframe(s) before and a few subframe(s) after the UE operational occasions (e.g., transmission or reception occasions). These subframes before and after the UE operational occasions are also known as WU and CD subframes, respectively, or preamble and postamble subframes, respectively. Examples of these occasions or scenarios are reception of subframes containing System Information Blocks (SIBs), paging occasion, DRX ON, etc. For example, in 3GPP documents R4-1708227 and R4-1710363, different numbers of WU and CD subframes are proposed for different scenarios (e.g., 6 subframes when UE receives system information and 4 subframes when the UE sends Random Access (RA)). The problem, however, with this solution is that even though the number of WU and CD subframes can be different in different scenarios, they are fixed in a particular scenario, i.e., WU/CD configuration is static. This requires the network node to switch on the RS transmission over larger bandwidths according to the predefined number of WU and CD subframes, regardless of system dynamics. Another major problem is that the network has to continually transmit RSs in full bandwidth in larger numbers of subframes regardless of the current conditions. But in practice and in real networks, the conditions (e.g., interference, UE power, UE signal quality, UE data rate, etc.) change over time. For example, UEs operating under good coverage may need no or a fewer number of warm-up WU and/or CD subframes. On the other hand, the same UE may need a larger number of WU and CD subframes later in time, e.g., due to sudden changes in propagation channel, due to usage of different algorithms, or procedure, etc. Therefore, having a fixed (static) number of WU and/or CD subframes (proposed solution in 3GPP documents R4-1708227 and R4-1710363) leads to inefficient usage of resources. Another drawback is that the interference will increase since the network has to configure the maximum possible number of WU and CD subframes regardless of the conditions. Overall, it will greatly reduce the gain of lean carrier operation. In the present disclosure, several embodiments that can be used to address this problem are provided.

SUMMARY

Certain aspects of the present disclosure and their embodiments may provide solutions to these or other challenges. The invention comprises several embodiments for a User Equipment (UE) and a network node.

In a first embodiment a UE, based on one or more criteria, obtains information about a Supplementary Activity Configuration (SAC) required by the UE for operating under lean carrier operation, wherein the SAC comprises a certain number (M) of Warm Up (WU) time resources and/or a certain number (N) of Cool Down (CD) time resources. The information about the SAC may further comprise a bandwidth and/or frequency resources (e.g., resource blocks, subcarriers, etc.) of the WU time resources and/or a bandwidth of the CD time resources. The information about SAC may further comprise a set of symbols or Resource Elements (REs) with the necessary reference signals within a resource block comprised in WU and/or CD subframes, which may also depend on the number of antenna ports used for transmitting the reference signals (e.g., more symbols are used for Cell-specific Reference Signals (CRS) within a resource block when CRS is transmitted from 4 Transmit (tx) antennas compared to 1 or 2 tx antennas). The information about the SAC may further comprise the information for which UE operation the SAC is needed, if not for any UE operation requiring WU and/or CD; there may also be two or more different SACs associated with different UE procedures/operations. The information SAC may also comprise an indication of whether the same SAC is applicable for several different or even all UE procedures requiring WU and/or CD. The UE further transmits the obtained information about the SAC to a network node. The UE obtains information about the SAC based on one or more criteria. Examples of criteria for obtaining the information about the SAC comprises: coverage enhancement level of the UE, UE battery life, required signal, or target quality at the UE, etc.

In a second embodiment a network node receives information about the SAC required by the UE for operating under lean carrier operation, wherein the SAC comprising the parameters M and/or N (as described in the first embodiment). The network node uses the received information about the SAC for performing one or more radio operational tasks, e.g., configuring WU and/or CD time resources in a cell, adapting the Discontinuous Reception (DRX) configuration, adapting Downlink (DL) and/or Uplink (UL) scheduling for this and other UEs (e.g., to allocate the needed resources for the necessary reference signals, coordinate the interference on those resources, etc.), transmitting the information to another node, adapting the transmit power of the necessary reference signals during WU and/or CD subframes, etc. In yet another aspect of this embodiment, the network node uses both i) the information about the SAC received from the UE (in the first embodiment) and ii) the information about the SAC obtained by the network node for performing one or more radio operational tasks, e.g., configuring WU and/or CD time resources in a cell, adapting the DRX configuration, adapting scheduling, transmitting the information to another node, etc.

In a third embodiment a network node, based on one or more criteria, obtains information about the SAC required by the UE for operating under lean carrier operation, wherein the SAC comprises the parameters K and/or L. The network node uses the obtained information about the SAC for configuring the UE with the parameters K and/or L. Examples of criteria for obtaining the information about the SAC are: a coverage enhancement level of the UE, a UE battery life, a required signal, or a target quality at the UE, available radio resources in the network node, etc.

In a fourth embodiment, a network node obtains the information about the SAC for two or more UEs and configures the necessary reference signals to be used by the multiple UEs. The network node may also inform UEs about the decided reference signal configuration.

The main difference compared to the existing solutions is that the proposed mechanisms enable the network to dynamically or semi-statically adapt (increase or decrease) the WU and/or CD subframes even in the same scenario (e.g., for paging or for reading system information). The motivation is that the actual need of the WU and CD subframes for the same procedure (e.g., for reading System Information (SI)) is not fixed; rather, it can change over time. The existing (conventional) solution requires the network to configure the maximum number of WU and CD, which is defined for the worst case scenario. But this approach is highly inefficient since system dynamics change over time. The dynamic adaptation of the WU/CD subframes is not a straightforward mechanism. Incorrect settings may significantly diminish the benefit of using lean carrier. The adaptation requires new procedures in the UE and in the network node. The adaptation is based on UE feedback (e.g., recommended values of WU and/or CD subframes, e.g., based on UE signal quality, UE power consumption, etc.) and/or based on the estimation done by the network node (e.g., based on radio conditions such as interference at the UE, etc.). This further requires new signaling between the UE and the network node. In the existing solution there is no mechanism to dynamically change or adjust any WU or CD subframe.

There are, proposed herein, various embodiments which address one or more of the issues disclosed herein.

Certain embodiments may provide one or more of the following technical advantage(s). The method disclosed herein according to some embodiments of the present disclosure allows the network to reduce the reference cell measurements when they are not used by the UE. This can reduce the inter-cell interference for neighbor cell UEs.

This method enables the network to more efficiently use its radio resources as it allows the network to transmit reference signals less frequently and only when they are to be used by the UEs.

The method can also help the UE to reduce its power consumption as it can inform the network about configurations requiring fewer subframes, e.g., when it is in good coverage conditions.

Compared to the static configuration of WU and CD subframes (where the reference signal is typically transmitted over full bandwidth of the cell) the dynamic adjustment of the WU and CD subframes based on the current need of the UE significantly reduces average interference in the network. This also reduces average transmit power in the network since the network does not have to configure the maximum possible number of WU and CD subframes all the time.

According to one aspect of the present disclosure, a method performed by a wireless device for lean carrier operation during which CRSs, are transmitted by a base station using a reduced bandwidth during an inactive time of a DRX mode of operation excluding a WU period that occurs immediately before a DRX active time and a CD period that occurs immediately after a DRX active time comprises: determining a number M of subframes to comprise a WU period; determining a number N of subframes to comprise a CD period; and transmitting an indication of the determined numbers M and N to a base station currently serving the wireless device.

In some embodiments, M and/or N is determined based at least in part on one or more criteria for operation of the wireless device during lean carrier operation, the criteria comprising: coverage enhancement level of the wireless device; battery life of the wireless device; required signal quality at the wireless device; required target quality at the wireless device; bandwidth of CRS during reduced bandwidth transmission; and/or bandwidth of CRS during non-reduced bandwidth transmission.

In some embodiments, transmitting the determined numbers M and N comprises transmitting information that defines or identifies a previously defined SAC which specifies values for M and N.

In some embodiments, the SAC specifies a bandwidth or set of frequency resources used during lean carrier operation.

In some embodiments, the SAC specifies a set of symbols or resource elements within a resource block comprised in WU and/or CD subframes.

In some embodiments, the SAC identifies one or more operations of the wireless device for which the SAC is needed.

In some embodiments, transmitting the indication of the determined numbers M and N comprises transmitting the numbers M and N.

In some embodiments, transmitting the indication of the determined numbers M and N comprises transmitting a value deltaM indicating a difference between M and a number of WU subframes currently used by the wireless device and transmitting a value deltaN indicating a difference between N and a number of CD subframes currently used by the wireless device.

In some embodiments, the method further comprises receiving, by the wireless device, an indication of a number K indicating a number of subframes comprising a WU period and a number L indicating a number of subframes comprising a CD period.

In some embodiments, K may be the same or different from M and wherein L may be the same or different from N.

In some embodiments, receiving an indication of a K and L comprises receiving information that defines or identifies a previously defined SAC which specifies values for K and L.

In some embodiments, the SAC specifies a bandwidth or set of frequency resources used during lean carrier operation.

In some embodiments, the SAC specifies a set of symbols or resource elements within a resource block comprised in WU and/or CD subframes.

In some embodiments, the SAC identifies one or more operations of the wireless device for which the SAC is needed.

In some embodiments, receiving the indication of K and L comprises receiving the numbers K and L.

In some embodiments, receiving the indication of K and L comprises receiving a value deltaK indicating a difference between K and a number of WU subframes currently used by the wireless device and transmitting a value deltaL indicating a difference between L and a number of CD subframes currently used by the wireless device.

In some embodiments, the indication of K and L is received from the base station currently serving the wireless device.

In some embodiments, the indication of K and L is received from a base station other than the base station currently serving the wireless device.

In some embodiments, the indication of K and L is received from a base station of a cell that is a candidate target for handover of the wireless device.

According to one aspect of the present disclosure, a method performed by a base station for lean carrier operation during which CRSs, of a cell are transmitted by the base station using a reduced bandwidth during an inactive time of a DRX mode of operation of a wireless device excluding a WU period that occurs immediately before a DRX active time and a CD period that occurs immediately after a DRX active time comprises: determining a number K of subframes to comprise a WU period; determining a number L of subframes to comprise a CD period; and transmitting an indication of the determined numbers K and L to another node.

In some embodiments, K and/or L is determined based at least in part on an indication of parameters M and/or N, respectively, received from a wireless device, wherein M indicates a number of subframes to comprise a WU period and N indicates a number of subframes to comprise a CD period.

In some embodiments, the received indication of M and N comprises received values for M and N.

In some embodiments, the received indication of M and N comprises information that defines or identifies a previously defined SAC which specifies values for M and N.

In some embodiments, K is set to the value of M and L is set to the value of N.

In some embodiments, K and L are determined by applying an operation on the values of M and N, respectively.

In some embodiments, K and L are determined based at least in part on a plurality of values of M and N respectively received from a plurality of wireless devices in the same cell.

In some embodiments, K and L are determined based at least in part on an activity state of at least one wireless device in the cell.

In some embodiments, the method further comprises configuring K number of WU subframes and/or L number of CD subframes in the cell.

In some embodiments, the method further comprises adapting a DRX configuration based at least in part on values of K and/or L.

In some embodiments, the method further comprises adapting scheduling of uplink and/or downlink signals to a wireless device.

In some embodiments, transmitting an indication of the determined numbers K and L to another node comprises transmitting the indication to a wireless device.

In some embodiments, transmitting an indication of the determined numbers K and L to another node comprises transmitting the indication to another base station.

In some embodiments, transmitting the indication of the determined numbers K and L comprises: transmitting K and L; or transmitting information that defines or identifies a previously defined SAC which specifies values for K and L.

In some embodiments, K and/or L is determined based at least in part on one or more criteria for operation of the wireless device during lean carrier operation, the one or more criteria comprising: coverage enhancement level of the wireless device; battery life of the wireless device; required signal quality at the wireless device; required target quality at the wireless device; bandwidth of CRS during reduced bandwidth transmission; and/or bandwidth of CRS during non-reduced bandwidth transmission.

In some embodiments, K and/or L is determined based at least in part on one or more characteristics of the cell, the one or more characteristics comprising: transmit power of a base station or wireless device; available or unused subframes; interference at a wireless device in the cell; received signal quality measurement results from a wireless device; transmit power used in a neighboring cell; and/or cell-to-cell interference.

In some embodiments, K and/or L is determined based on information received by the base station from another base station currently serving a wireless device that is a candidate for handover.

In some embodiments, a handover decision is based at least in part on the determined K and/or L.

In some embodiments, a composite value K' is determined based on K and a value M indicated by the wireless device and wherein a composite value L' is determined based on L and a value N indicated by the wireless device.

In some embodiments, the method further comprises determining K and L based at least in part on a plurality of values of M and N respectively received from a plurality of wireless devices in the same cell and determining a common SAC the accommodates reference signals to be used by the plurality of wireless devices.

In some embodiments, determining the common SAC comprises performing a function on a plurality of SACs for a same or similar wireless device operation or having overlapping time and/or frequency resources.

According to one aspect of the present disclosure, a wireless device for lean carrier operation during which CRSs, are transmitted by a base station using a reduced bandwidth during an inactive time of a DRX mode of operation excluding a WU period that occurs immediately before a DRX active time and a CD period that occurs immediately after a DRX active time, the wireless device comprising: processing circuitry configured to perform any of the wireless device methods disclosed herein; and power supply circuitry configured to supply power to the wireless device.

According to one aspect of the present disclosure, a base station for lean carrier operation during which CRSs, of a cell are transmitted by the base station using a reduced bandwidth during an inactive time of a DRX mode of operation of a wireless device excluding a WU period that occurs immediately before a DRX active time and a CD period that occurs immediately after a DRX active time, the base station comprising: processing circuitry configured to perform any of the base station methods disclosed herein; power supply circuitry configured to supply power to the wireless device.

According to one aspect of the present disclosure, a UE for lean carrier operation during which CRSs, are transmitted by a base station using a reduced bandwidth during an inactive time of a DRX mode of operation excluding a WU period that occurs immediately before a DRX active time and a CD period that occurs immediately after a DRX active time, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the wireless device methods disclosed herein; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

According to one aspect of the present disclosure, a communication system including a host computer comprising: processing circuitry configured to provide user data; and a communication interface configured to forward the user data to a cellular network for transmission to a UE wherein the cellular network comprises a base station having a radio interface and processing circuitry, the base station's processing circuitry configured to perform any of the base station methods disclosed herein.

In some embodiments, the communication system further includes the base station.

In some embodiments, the communication system further includes the UE and the UE is configured to communicate with the base station.

In some embodiments, the processing circuitry of the host computer is configured to execute a host application, thereby providing the user data; and the UE comprises processing circuitry configured to execute a client application associated with the host application.

According to one aspect of the present disclosure, a method implemented in a communication system including a host computer, a base station and a UE comprises: at the host computer, providing user data; and at the host computer, initiating a transmission carrying the user data to the UE via a cellular network comprising the base station, wherein the base station performs any of the base station methods disclosed herein.

In some embodiments, the method further comprises at the base station, transmitting the user data.

In some embodiments, the user data is provided at the host computer by executing a host application, the method further comprising, at the UE, executing a client application associated with the host application.

According to one aspect of the present disclosure, a UE configured to communicate with a base station, the UE comprising a radio interface and processing circuitry configured to perform any of the wireless device methods disclosed herein.

According to one aspect of the present disclosure, a communication system including a host computer comprising: processing circuitry configured to provide user data; and a communication interface configured to forward user data to a cellular network for transmission to a UE wherein the UE comprises a radio interface and processing circuitry, the UE's components configured to perform any of the wireless device methods disclosed herein.

In some embodiments, the cellular network further includes a base station configured to communicate with the UE.

In some embodiments, the processing circuitry of the host computer is configured to execute a host application, thereby providing the user data; and the UE's processing circuitry is configured to execute a client application associated with the host application.

According to one aspect of the present disclosure, a method implemented in a communication system including a host computer, a base station and a UE comprises: at the host computer, providing user data; and at the host computer, initiating a transmission carrying the user data to the UE via a cellular network comprising the base station, wherein the UE performs any of the wireless device methods disclosed herein.

In some embodiments, the method further comprises at the UE, receiving the user data from the base station.

According to one aspect of the present disclosure, a communication system includes a host computer comprising: a communication interface configured to receive user data originating from a transmission from a UE to a base station, wherein the UE comprises a radio interface and processing circuitry, the UE's processing circuitry configured to perform any of the wireless device methods disclosed herein.

In some embodiments, the communication system further includes the UE.

In some embodiments, the communications system further includes the base station, wherein the base station comprises a radio interface configured to communicate with the UE and a communication interface configured to forward to the host computer the user data carried by a transmission from the UE to the base station.

In some embodiments, the processing circuitry of the host computer is configured to execute a host application; and the UE's processing circuitry is configured to execute a client application associated with the host application, thereby providing the user data.

In some embodiments, the processing circuitry of the host computer is configured to execute a host application, thereby providing request data; and the UE's processing circuitry is configured to execute a client application associated with the host application, thereby providing the user data in response to the request data.

According to one aspect of the present disclosure, a method implemented in a communication system including a host computer, a base station and a User Equipment (UE) comprises: at the host computer, receiving user data transmitted to the base station from the UE, wherein the UE performs any of the wireless device methods disclosed herein.

In some embodiments, the method further comprises at the UE, providing the user data to the base station.

In some embodiments, the method further comprises: at the UE, executing a client application, thereby providing the user data to be transmitted; and at the host computer, executing a host application associated with the client application.

In some embodiments, the method further comprises: at the UE, executing a client application; and at the UE, receiving input data to the client application, the input data being provided at the host computer by executing a host application associated with the client application, wherein the user data to be transmitted is provided by the client application in response to the input data.

According to one aspect of the present disclosure, a communication system including a host computer comprising a communication interface configured to receive user data originating from a transmission from a UE to a base station, wherein the base station comprises a radio interface and processing circuitry, the base station's processing circuitry configured to perform any of the base station methods disclosed herein.

In some embodiments, the communication system further includes the base station.

In some embodiments, the communication system further includes the UE, wherein the UE is configured to communicate with the base station.

In some embodiments, the processing circuitry of the host computer is configured to execute a host application; the UE is configured to execute a client application associated with the host application, thereby providing the user data to be received by the host computer.

According to one aspect of the present disclosure, a method implemented in a communication system including a host computer, a base station and a UE comprises: at the host computer, receiving, from the base station, user data originating from a transmission which the base station has received from the UE, wherein the UE performs any of the wireless device methods disclosed herein.

In some embodiments, the method further comprises at the base station, receiving the user data from the UE.

In some embodiments, the method further comprises at the base station, initiating a transmission of the received user data to the host computer.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 4 illustrates one specific example of the lean carrier operation in a cell;

FIG. 5 illustrates another specific example of the lean carrier operation in a cell, in which a certain number of CD and WU subframes are configured before and after the User Equipment's (UE's) active occasions;

FIG. 18 depicts a method performed by a wireless device for lean carrier operation according to some embodiments disclosed herein;

FIG. 19 depicts a method performed by a base station for lean carrier operation according to some embodiments disclosed herein.

DETAILED DESCRIPTION

Figure 1:
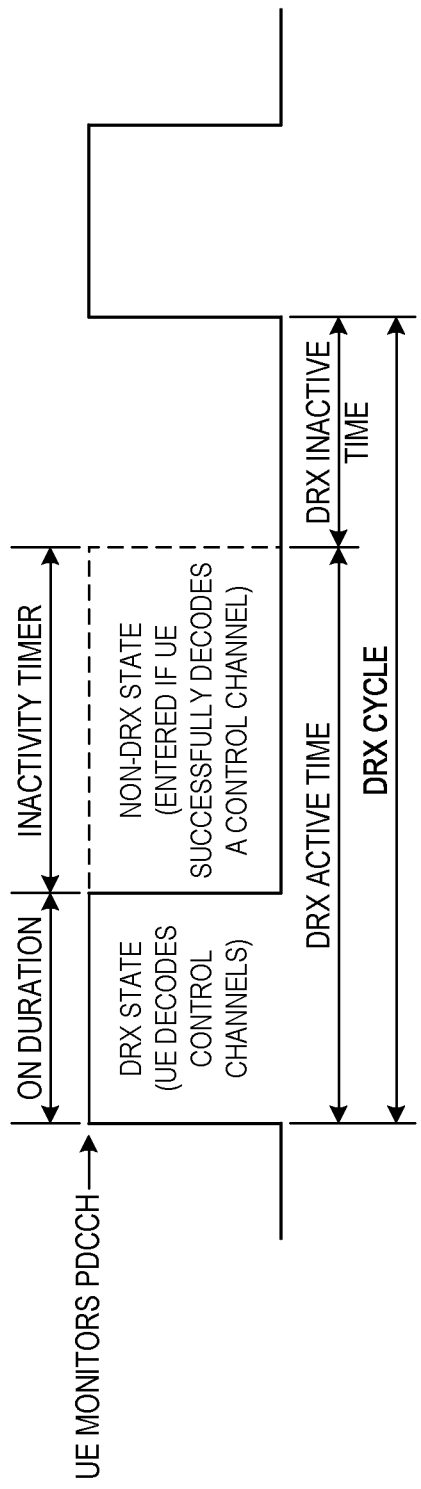
FIG. 1 illustrates conventional Discontinuous Reception (DRX) operation in Long Term Evolution (LTE)
Figure 2:
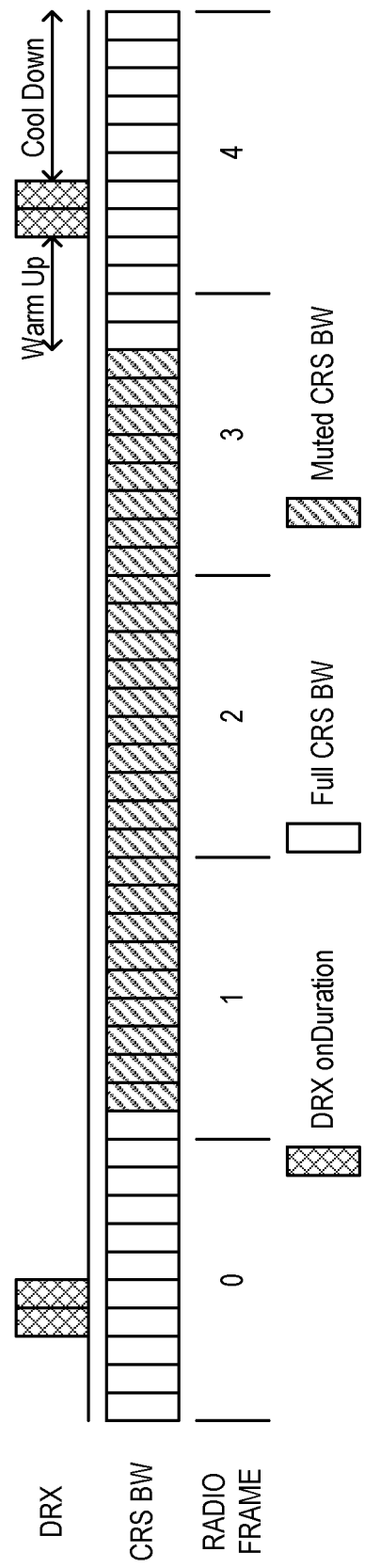
FIG. 2 illustrates a conventional Cell-specific Reference Signal (CRS) muting operation.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

General Description of Scenario

In some embodiments a more general term "network node" is used and it can correspond to any type of radio network node or any network node, which communicates with a User Equipment (UE) and/or with another network node. Examples of network nodes are NodeBs, enhanced or evolved NodeBs (eNBs), Master eNBs (MeNBs), Secondary eNBs (SeNBs), a network node belonging to a Main Cell Group (MCG) or Secondary Cell Group (SCG), a base station, Multi-Standard Radio (MSR) radio nodes such as an MSR base station, network controllers, Radio Network Controllers (RNCs), Base Station Controllers (BSCs), relays, donor node controlling relays, Base Transceiver Stations (BTSs), Access Points (APs), transmission points, transmission nodes, Remote Radio Units (RRUs), Remote Radio Heads (RRHs), nodes in a Distributed Antenna System (DAS), core network nodes (e.g., Mobile Switching Centers (MSCs), Mobility Management Entities (MMEs), etc.), Operation and Maintenance (O&M), Operations Support Systems (OSSs), Self-Organizing Networks (SONs), positioning nodes (e.g., an Evolved Serving Mobile Location Center (E-SMLC)), Minimization of Drive Tests (MDT), etc.

In some embodiments the non-limiting terms UE or a wireless device are used interchangeably. The UE herein can be any type of wireless device capable of communicating with a network node or another UE over radio signals. The UE may also be a radio communication device, a target device, a Device-to-Device (D2D) UE, a machine type UE or UE capable of Machine-to-Machine (M2M) communication, a low-cost and/or low-complexity UE, a sensor equipped with a UE, a tablet, mobile terminals, a smart phone, Laptop Embedded Equipped (LEE), Laptop Mounted Equipment (LME), Universal Serial Bus (USB) dongles, Customer Premises Equipment (CPE), an Internet of Things (IoT) device, or a Narrowband IoT (NB-IoT) device, etc.

Also, in some embodiments the generic term "radio network node" is used. It can be any kind of a radio network node which may comprise any of a base station, radio base station, base transceiver station, base station controller, network controller, RNC, eNB, Node B, Multi-cell/multicast Coordination Entity (MCE), relay node, access point, radio access point, RRU, or RRH.

In some embodiments the UE may be configured with Primary Cell (PCell) and Primary/Secondary Cell (PSCell) or with PCell, PSCell and one or more Secondary Cells (SCells) such as in dual connectivity and/or carrier aggregation. The configured cells are UE specific, also known as serving cells of the UE.

The embodiments are applicable for a UE in a low or in high activity state. Examples of low activity states are Radio Resource Control (RRC) idle state, idle mode, RRC inactive state, etc. Examples of high activity states are RRC CONNECTED state, active mode, active state, etc. The UE may be configured to operate in Discontinuous Reception (DRX) or in non-DRX. If configured to operate in DRX, it may still operate according to non-DRX as long as it receives new transmissions from the network node.

The UE may operate under normal coverage, extended coverage or extreme coverage with respect to its serving cell or the target cell on which the measurement is to be performed. These coverage classes are also interchangeably called normal coverage and enhanced coverage in some cases. The UE may also operate in a plurality of coverage levels, e.g., normal coverage, enhanced coverage level 1, enhanced coverage level 2, enhanced coverage level 3, and so on.

The coverage level may be expressed in terms of:
received signal quality and/or received signal strength at the UE with respect to its serving cell, and/or
received signal quality and/or received signal strength at the serving cell with respect to the UE.

Examples of signal quality are Signal to Noise Ratio (SNR), Signal to Interference plus Noise Ratio (SINR), Channel Quality Information (CQI), Reference Signal Received Quality (RSRQ), Cell-specific Reference Signal (CRS) Ês/Iot, Synchronization Channel (SCH) Ês/Iot, etc. Examples of signal strength are path loss, Reference Signal Received Power (RSRP), Synchronization Channel Received Power (SCH_RP), etc. The notation Ês/Iot is defined as ratio of Ês, which is the received energy per Resource Element (RE) (power normalized to the subcarrier spacing) during the useful part of the symbol, i.e., excluding the cyclic prefix, at the UE antenna connector, to Iot which is the received power spectral density of the total noise and interference for a certain RE (power integrated over the RE and normalized to the subcarrier spacing) as measured at the UE antenna connector Consider an example of two coverage levels defined with respect to signal quality (e.g., SNR) at the UE comprising:

Coverage enhancement level 1 (CE1) comprising SNR≥−6 Decibels (dB) at UE with respect to its serving cell; and Coverage enhancement level 2 (CE2) comprising −12 dB≤SNR<−6 dB at UE with respect to its serving cell.

Consider another example of four coverage levels comprising:

Coverage enhancement level 1 (CE1) comprising SNR≥−6 dB at UE with respect to its serving cell;

Coverage enhancement level 2 (CE2) comprising −12 dB≤SNR<−6 dB at UE with respect to its serving cell;

Coverage enhancement level 3 (CE3) comprising −15 dB≤SNR<−12 dB at UE with respect to its serving cell; and Coverage enhancement level 4 (CE4) comprising −18 dB≤SNR<−15 dB at UE with respect to its serving cell.

In the above example, the CE1 may also interchangeably be called normal coverage level, baseline coverage level, reference coverage level, legacy coverage level, etc. On the other hand, CE2-CE4 may be termed enhanced coverage or extended coverage level.

In lean carrier operation, Reference Signal (RS) transmissions are not transmitted, or transmitted over reduced bandwidth during time resources, when the UE receiver is inactive, e.g., during DRX OFF periods. But there are also several occasions called herein as UE Active Occasions (AO) where a UE may be engaged in reception or transmissions, some of which are listed below:

Subframe containing system information, e.g., System Information Blocks (SIBs);

Paging occasions;

DRX ON durations;

Subframes configured for Machine-Type Communication for Physical Downlink Control Channel (MPDCCH) monitoring in MTC;

Random Access Channel (RACH) occasions (e.g., during message MSG2 or MSG4 reception); and Reception of data or control information e.g., Physical Downlink Shared Channel (PDSCH), etc.

During these AOs at least the UE receiver is active or ON, e.g., receiving signals from a cell. Therefore during these UE's AOs, the RS transmissions are always switched ON at least over the UE bandwidth by the serving network node of the UE, e.g., a serving cell. The UE may, however, wake up in one or more time resources prior to these AO to "warm up" and prepare its receiver/transmitter for reception/transmission, e.g., for performing time and/or frequency tracking of the serving cell. The time resources prior to the AO (e.g., before the DRX ON duration) are referred to herein as Warm Up (WU) time resources. Similarly, the UE may also keep its receiver switched ON after the UE's AO to perform, e.g., cross-channel estimation, post processing of the received signals during AO, etc. These time resources after the AO and used by the UE are known as the Cool Down (CD) time resources. The WU and CD time resources are also interchangeably referred to herein as preamble and postamble time resources. The serving network node is expected to provide RS transmissions over at least the UE bandwidth during these WU and/or CD time resources. The combination of WU and/or CD time resources herein are also referred to herein as the UE's Supplementary Activity Configuration (SAC). Examples of time resources are subframes, slots, symbols, frames, mini-slots, Transmit Time Intervals (TTIs), shortened TT's (sTTIs), etc. Examples of RSs are CRSs, Demodulation Reference Signals (DMRSs), Multimedia Broadcast Multicast Service Single Frequency Network (MBSFN) RSs, Channel State Information RSs (CSI-RSs), Discovery Reference Signals (DRSs), Synchronization Signals (SSs), etc. The lean carrier operation is also interchangeably referred to herein as RS muting, an operation with muted or reduced RS, etc.

Figure 3:
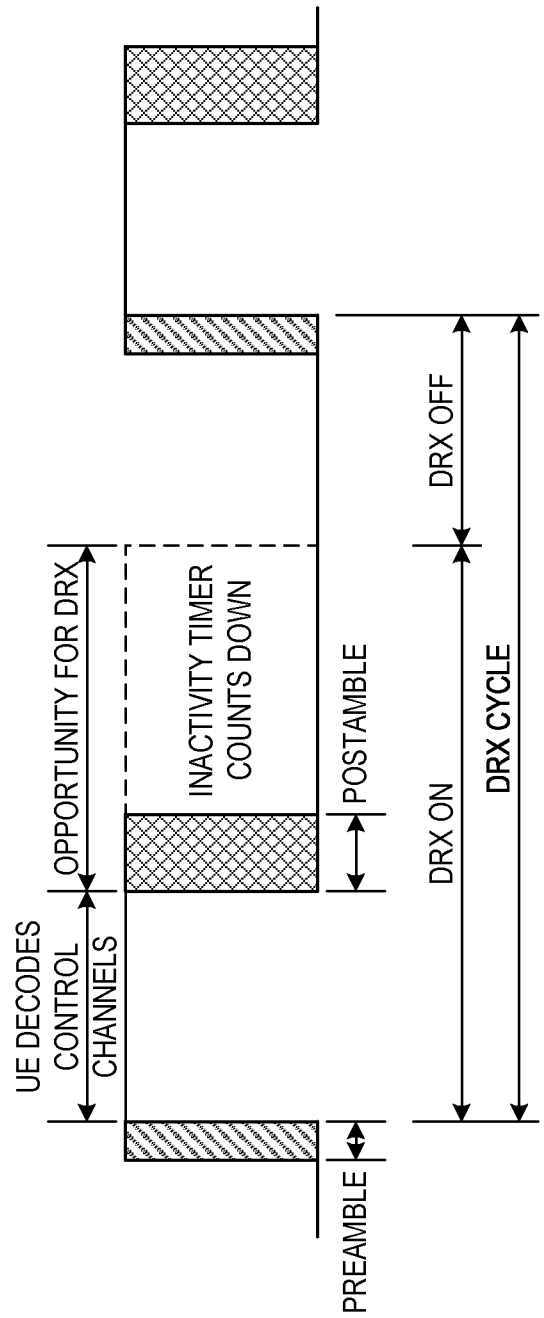
FIG. 3 illustrates DRX operation with Warm Up (WU) and Cool Down (CD) periods according to some embodiments of the present disclosure.

FIG. 3 illustrates one example of the lean operation with DRX operation. The receiver circuitry is switched off during the DRX OFF duration, and it typically wakes up prior to the ON duration to prepare the receiver for reception. The UE may use the RS transmissions which are present during the WU/CD subframes to do time or frequency tracking, acquiring Automatic Gain Control (AGC), adjusting Automatic Frequency Control (AFC), doing channel estimation, post processing, etc. The serving network node is thus expected to provide RS transmissions during the WU/CD subframes for these purposes.

FIG. 4 illustrates one specific example of the lean carrier operation in a cell (cell1), e.g., cell1 is the serving cell. As can be seen in FIG. 4, the RSs are transmitted over two different frequency locations called a first frequency location (FL1) and a second frequency location (FL2). FL1 is referred to one location in the frequency domain where the RS is continuously transmitted regardless of the UE activity state, e.g., this can be the center 6 Physical Resource Blocks (PRBs) within the cell bandwidth in all the time resources. For example, FL1 may consist of 6, 7, 8, or 9 PRBs. The RS transmissions in the FL1 takes place during UE inactive time such as when the UE is in DRX OFF duration. From time to time, RS transmission also takes place over frequency location FL2. FL2 transmission typically takes place during UE AO or activity state such as DRX ON durations, and the size of it may correspond to at least the bandwidth where the UE is configured for reception. The size of FL2 may correspond to the full cell bandwidth or the UE Radio Frequency (RF) bandwidth (e.g., 1.4 Megahertz (MHz), 5 MHz, 20 MHz), e.g., the bandwidth over which the UE receiver is capable of receiving signals. For example, the UE RF bandwidth (e.g., for an MTC UE) can be smaller than the system bandwidth (e.g., 20 MHz) of the serving cell. The example in FIG. 4 shows that in FL2 the RS (e.g., CRS) is transmitted over the full bandwidth of cell1. The FL2 bandwidth can be shorter (e.g., 24 Resource Blocks (RBs)) in case the UE bandwidth is smaller than the cell bandwidth, e.g., for MTC UE.

FIG. 5 illustrates another specific example of the lean carrier operation in cell1 where a certain number of CD and WU subframes are configured before and after the UE's AO (e.g., ON duration of the DRX cycle), respectively. The bandwidths of the WU and the CD subframes correspond to the bandwidth of FL2, e.g., full cell1's bandwidth.

First Embodiment: Methods for Provision of Number of WU/CD Subframes Needed by Wireless Device in Serving Cell According to a first embodiment, a UE obtains information about the UE's SAC required by the UE based on one or more criteria for the UE operation under lean carrier operation. Examples of criteria for obtaining the information about the SAC are: a coverage enhancement level of the UE, the UE battery life, a required signal or target quality at the UE, the type of lean carrier operation (e.g., a bandwidth of a muted RS, a bandwidth of an unmuted RS, etc.), and other information.

The required SAC comprises at least one of the following two parameters: an information about a certain number (M) of WU time resources, and an information about a certain number (N) of CD time resources. The information about SAC may further comprise one or more of: a bandwidth of the WU time resources; and a bandwidth of the CD time resources required by the UE during lean carrier operation. The UE, after obtaining the information about the required SAC, transmits the obtained information to a network node (e.g., to a serving cell). The SAC therefore refers to the activity required by the UE receiver for enabling the UE to perform one or more operations or procedures on lean carrier. Examples of such operations or procedures are receiving one or more channels (e.g., a control channel, such as a Physical Downlink Control Channel (PDCCH), an MPDCCH, a data channel such as a PDSCH, etc.), performing channel estimation, performing one or more measurements (e.g., Reference Signal Time Difference (RSTD), radio link monitoring, etc.), etc.

In one specific example, the SAC may comprise two possible configurations or sets of the parameters M and N as shown in Table 1. Yet another specific example with actual values of M and N is shown in Table 2.

TABLE 1

| An example of SAC with two sets of M and N | | |
|---|---|---|
| SAC configuration ID | Number of WU subframes (M) | Number of CD subframes (N) |
| 0 | M1 | N1 |
| 1 | M2 | N2 |

TABLE 2

| An example of SAC with two sets of M and N | | |
|---|---|---|
| SAC configuration ID | Number of WU subframes (M) | Number of CD subframes (N) |
| 0 | 1 | 1 |
| 1 | 4 | 2 |

The method in the wireless device according to the first embodiment can be summarized by the following exemplary steps:

Step 1: Obtaining information about a SAC comprising a certain number of WU time resources (e.g., subframes) and/or a certain number of CD time resources (e.g., subframes) required by the UE in a reference cell under a lean carrier operation in the reference cell (e.g., serving cell, PCell), Step 2: Transmitting the obtained information about the SAC to a network node.

The abovementioned steps are described in more detail below.

The UE may further rely on that the requested configuration is available, in one example, and perform the corresponding UE operation, after time delta0 (which should be ideally zero but may be non-zero and be predefined in practice to account for protocol delays, configuration delays at the network side, e.g., to allow for rescheduling, etc.).

Step 3 (in some examples): In another example, in response to the transmitted information about the SAC, the UE may receive a message or indication with the actual SAC to use which may (in one example) or may not (in another example) be the same as the UE requested/indicated, e.g., to account for multiple UEs. The message or indication may also comprise an acknowledgement from the network node that the SAC is received and the RSs according to the SAC are made available. Upon receiving such a message/indication, the UE may start using the RSs. The message may also comprise a SAC which is different from what was sent by the UE, e.g., a common SAC configuration (see embodiment #4), or an updated (by the network node) configuration if for some reason the SAC requested by the UE is not possible.

Step 1

In this step, the UE obtains information about the SAC required by the UE performing operations on a lean carrier. The obtaining may be based on one or more criteria or scenario in which the UE is operating. Examples of such criteria or scenarios are: a signal level at the UE with respect to the serving cell, a Coverage Enhancement (CE level with respect to the serving cell, a UE battery life, a DRX cycle configuration, etc. Examples of signal levels are: signal strength, signal quality, etc., at the UE. Examples of signal strengths are: path loss, RSRP, etc. Examples of signal qualities are: SINR, SNR, RSRQ, etc.

In order to obtain the information about the SAC, the UE may therefore first determine the scenario in which the UE is operating. For example, the UE may perform a measurement to determine the signal level, estimate its battery power to determine its battery life, determine CE level, etc. For example, the UE may determine the CE level based on one or more of the following mechanisms, e.g., by receiving information from the network node (e.g., configured with CEModeA or CEModeB), based on the measurement signal level, based on historical data or statistics or past history, etc.

The UE may then map or relate the determined operating scenario with a suitable SAC configuration. The mapping or relation can be based on one or more of the following: a predefined rule, an autonomous determination by the UE, information received from the network node, etc. This is explained with a few examples below:

- If the UE battery life is below a certain threshold, then the UE determines or selects a SAC configuration comprising M above the certain threshold and/or N above the certain threshold; otherwise the UE determines or selects a SAC configuration comprising M equal to or below the certain threshold and/or N equal to or below the certain threshold. For example, in the former case the UE selects a SAC configuration #0 in Table 2, and in the latter case the UE selects a SAC configuration #1 in Table 2.
- If the UE CE level is in enhanced coverage, then the UE determines or selects a SAC configuration comprising M above a certain threshold and/or N above the certain threshold; otherwise if the UE is in normal coverage then the UE determines or selects a SAC configuration comprising M equal to or below the certain threshold and/or N equal to or below the certain threshold. For example, in the former case the UE selects SAC configuration #0 in Table 2, and in the latter case the UE selects SAC configuration #1 in Table 2.
- If the UE signal level is below a certain signal level threshold, then the UE determines or selects a SAC configuration comprising M above the certain threshold and/or N above the certain threshold; otherwise the UE determines or selects a SAC configuration comprising M equal to or below the certain threshold and/or N equal to or below the certain threshold. For example, in the former case the UE selects a SAC configuration #0 in Table 2, and in the latter case the UE selects a SAC configuration #1 in Table 2.

In yet another embodiment, the UE can determine the values of M and N based on historical data or statistics, as described below with a few examples:

- M and N correspond to the number of WU subframes and number of CD subframes, respectively, used by the UE during the last UE active time period (e.g., when UE receiver is ON).
- M and N correspond to the number of WU subframes and number of CD subframes, respectively, used by the UE over the last X number of UE active time periods.
- M and N correspond to the maximum number of WU subframes and the maximum number of CD subframes, respectively, used by the UE over the last X number of UE active time periods
- M and N correspond to the average number of WU subframes and average number of CD subframes, respectively, used by the UE over the last X number of UE active time periods.

As stated above, the number of WU and/or CD subframes (e.g., parameters M and N) needed by the UE may be coupled to a specific coverage level of the UE, e.g., with respect to the serving cell. For example, the serving cell of a UE that is configured in CEModeA may need to provide one Downlink (DL) subframe for WU and one DL subframe for CD. The corresponding number can be 4 in CEModeB. This can be predefined, e.g., specified according to which network node switches ON the RS transmission before and after the UE active periods. In this case, the UE may compare the number of WU/CD subframes needed for the determined coverage level and the currently used number of WU/CD subframes. In one example a new, preferred, number of subframes can be derived as follows:

Temporarily needed WU/CD subframes=Number of WU/CD subframes needed for determined coverage level CEx−currently used number of WU/CD subframes (1)

In the above example, the delta value gives an indication of whether the UE is capable of using fewer subframes to carry out the necessary procedures.

In yet another embodiment, the UE may determine that the network node needs to provide RS transmissions within at least the UE bandwidth over two DL WU subframes when it is configured in CEModeA, but the network node may transmit RS within at least the UE bandwidth over four DL WU subframes when configured mode is CEModeB.

In yet another embodiment, the UE may compare the number of subframes used for CD/WU to the maximum configured number, as shown below:

Temporarily needed WU/CD subframes=(Number of WU/CD subframes needed according to current configuration or maximum configured number)−currently used number of WU/CD subframes In yet another embodiment, the UE may also determine the preferred number of subframes for WU and CD subframes based on the required UE reception and/or transmission performance. Examples of performance criteria are Block Error Ratio (BLER), SINR, etc. For example, if the target BLER of a certain channel (e.g., PDSCH, or the number of failed paging receptions, or the transmit timing error) is below a certain threshold level (e.g., 1%), then the UE may require a larger number of WU/CD subframes (e.g., with configuration #1 in Table 2). Otherwise, if the target BLER is larger than the threshold, then the UE can operate using the current number of WU/CD subframes configured in the serving cell or with a configuration comprising fewer WU/CD subframes e.g., with configuration #0 in Table 2.

Step 2

In this step, the UE transmits the information about the determined SAC in the previous step to the network node, e.g., the serving cell. The UE may apply different methods to inform the network about the preferred number of WU/CD subframes, e.g., information about SAC. The UE may transmit the information to the network node using higher layer signaling (e.g., RRC, etc.) and/or lower layer signaling (e.g., Layer 1 (L1), Medium Access Control (MAC), etc.). This is explained with several examples below:

In one example, one bit is used by the UE to indicate the number of WU and/or CD subframes needed by the UE in the serving cell under lean carrier operation. For example, one bit is used for transmitting the SAC information in Table 2.

In another example, two bits are used by the UE to indicate the number of WU and/or CD subframes needed by the UE in the serving cell under lean carrier operation, e.g., temporarily needed WU and/or CD subframes as part of the SAC information. The signaled values are described in following examples:

Table 3 shows an example where the reported values for WU subframes are modified using multiplication and division operations relative to a reference value. Examples of reference values are: the currently used value, a certain predefined value, the value configured by the network in the last configuration, the last value reported by the UE, etc. However, other operations such as additions and subtraction on the reference value may also be possible with respect to the currently used values. The required number of CD subframes required by the UE in the serving cell can be reported using a similar table.

number may be the maximum number of required subframes for WU and for CD. The UE may evaluate the current situation (e.g., signal level, CE level, etc.) as described above to determine if the maximum number of needed subframes is currently applicable or if another number of subframes would be suitable. If the UE determines that a different number of WU and/or CD subframes is suitable in the current situation, then the UE may provide an indication to the network node of those numbers of WU and/or CD subframes as part of the SAC. Therefore, the number of WU and/or CD subframes within the SAC is also interchangeably referred to herein as the temporarily needed number of WU and/or CD subframes. If the UE is in a situation where the UE requires the maximum number of subframes for WU and/or CD, then the UE may refrain from sending an indication of a temporarily needed number of subframes. In this case the network node (e.g., eNB) would then assume that the UE currently needs the maximum number of required WU and/or CD subframes as indicated in its capability.

The following section provides several specific examples (e.g., RRC messages) related to signaling of SAC information by the UE to the network node.

Providing the Temporary Number of Subframes when Connecting to the Network

In one embodiment, the UE indicates the temporarily needed number of WU and CD subframes by sending a message to the network.

One way to indicate the temporarily needed number of subframes is that the UE selects a certain resource when connecting to the network. For example, the UE may select a certain random access resource, such as a certain preamble

TABLE 3

Example of number of WU subframes which is reported to the network node

| Parameter | Value of requiredNrofWarmUpSubframes-r15 | Comment | Reported Index |
|---|---|---|---|
| N1 | CurrentValue/2 | Reduce the currently used WU subframes by 2 | 0 |
| N2 | CurrentValue/4 | Reduce the currently used WU subframes by 2 | 1 |
| N3 | CurrentValue*2 | Increase the currently used WU subframes by factor 2 | 2 |
| N4 | CurrentValue*4 | Increase the currently used WU subframes by factor 4 | 3 |

Table 4 gives an example where the UE indicates an explicit number of WU subframes (2, 4, 8, or 16) required by the UE in the serving cell.

type and/or format for performing the random access procedure, e.g., in message 1. Some preambles may then be reserved for when the UE should indicate the number of

TABLE 4

Another example of WU subframes which is reported to the network node

| Parameter | Value of requiredNrofWarmUpSubframes-r15 | Comment | Reported Index |
|---|---|---|---|
| N1 | 2 | Use 2 DL subframes for WU | 0 |
| N2 | 4 | Use 4 DL subframes for WU | 1 |
| N3 | 8 | Use 8 DL subframes for WU | 2 |
| N4 | 16 | Use 16 DL subframes for WU | 3 |

In another example, the UE may indicate the required number of WU and/or CD subframes as part of the SAC information using UE capability signaling. For example, this needed WU or CD subframes, and if the UE determines that the temporary number of subframes is different than the maximum number, the UE would select that resource from a set of resources which are for providing such an indication. While this allows that the information is provided to the network early during the connection procedure, it may cost resources since some resources may need to be reserved for providing such an indication.

One way to indicate the temporary number of subframes which are needed is the UE indicates them in a message sent when the UE connects to the network, e.g., in message 3 during the random access procedure. This has the benefit that the network gets this information early and hence could take this information into account early. One candidate message where this information can be provided is in the RRCConnectionSetupComplete message, and another candidate is the RRCConnectionResumeComplete message. Below is an example of how the embodiment can be implemented by sending the information in the RRCConnectionSetupComplete message, and the changes compared to the current specification are shown with underlined text.

```
BEGINNING OF EXAMPLE
-   RRCConnectionSetupComplete
The RRCConnectionSetupComplete message is used to confirm the successful completion of
an RRC connection establishment.
Signalling radio bearer: SRB1
RLC-SAP: AM
Logical channel: DCCH
Direction: UE to E-UTRAN
RRCConnectionSetupComplete message
-- ASN1START
RRCConnectionSetupComplete ::=             SEQUENCE {
    rrc-TransactionIdentifier              RRC-TransactionIdentifier,
    criticalExtensions                     CHOICE {
        c1                                     CHOICE{
            rrcConnectionSetupComplete-r8          RRCConnectionSetupComplete-r8-IEs,
            spare3 NULL, spare2 NULL, spare1 NULL
        },
        criticalExtensionsFuture               SEQUENCE { }
    }
}
RRCConnectionSetupComplete-r8-IEs ::= SEQUENCE {
    selectedPLMN-Identity                  INTEGER (1..maxPLMN-r11),
    registeredMME                          RegisteredMME                              OPTIONAL,
    dedicatedInfoNAS                       DedicatedInfoNAS,
    nonCriticalExtension                   RRCConnectionSetupComplete-v8a0-IEs        OPTIONAL
}
RRCConnectionSetupComplete-v8a0-IEs ::= SEQUENCE {
    lateNonCriticalExtension               OCTET STRING                               OPTIONAL,
    nonCriticalExtension                   RRCConnectionSetupComplete-v1020-IEs       OPTIONAL
}
RRCConnectionSetupComplete-v1020-IEs ::= SEQUENCE {
    gummei-Type-r10                        ENUMERATED {native, mapped}                OPTIONAL,
    rlf-InfoAvailable-r10                  ENUMERATED {true}                          OPTIONAL,
    logMeasAvailable-r10                   ENUMERATED {true}                          OPTIONAL,
    rn-SubframeConfigReq-r10               ENUMERATED {required, notRequired}         OPTIONAL,
    nonCriticalExtension                   RRCConnectionSetupComplete-v1130-IEs       OPTIONAL
}
RRCConnectionSetupComplete-v1130-IEs ::= SEQUENCE {
    connEstFailInfoAvailable-r11           ENUMERATED {true}                          OPTIONAL,
    nonCriticalExtension                   RRCConnectionSetupComplete-v1250-IEs
    OPTIONAL
}
RRCConnectionSetupComplete-v1250-IEs ::= SEQUENCE {
    mobilityState-r12                      ENUMERATED {normal, medium, high, spare}
    OPTIONAL,
    mobilityHistoryAvail-r12               ENUMERATED {true}                          OPTIONAL,
    logMeasAvailableMBSFN-r12              ENUMERATED {true}                          OPTIONAL,
    nonCriticalExtension                   RRCConnectionSetupComplete-v1320-IEs                OPTIONAL
}
RRCConnectionSetupComplete-v1320-IEs ::= SEQUENCE {
    ce-ModeB-r13                           ENUMERATED {supported}
    OPTIONAL,
    s-TMSI-r13                             S-TMSI
    OPTIONAL,
    attachWithoutPDN-Connectivity-r13      ENUMERATED {true}
    OPTIONAL,
    up-CIoT-EPS-Optimisation-r13           ENUMERATED {true}
    OPTIONAL,
    cp-CIoT-EPS-Optimisation-r13           ENUMERATED {true}
    OPTIONAL,
    nonCriticalExtension                   RRCConnectionSetupComplete-v1330-IEs
    OPTIONAL
}
RRCConnectionSetupComplete-v1330-IEs ::= SEQUENCE {
    ue-CE-NeedULGaps-r13                       ENUMERATED {true}                      OPTIONAL,
    nonCriticalExtension                   RRCConnectionSetupComplete-v1430-IEs
    OPTIONAL
}
RRCConnectionSetupComplete-v1430-IEs ::= SEQUENCE {
```

-continued

```
    dcn-ID-r14                            INTEGER (0..65535)                      OPTIONAL,
    nonCriticalExtension                  RRCConnectionSetupComplete-v1500-IEs            OPTIONAL
}
RRCConnectionSetupComplete-v1500-IEs ::= SEQUENCE {
    warmUpCoolDownSubframeReport-r15      WarmUpCoolDownSubframeReport-r15        OPTIONAL,
    nonCriticalExtension                  SEQUENCE { }                            OPTIONAL
}
WarmUpCoolDownSubframeReport-r15 ::= SEQUENCE {
    requiredNrofWarmUpSubframes-r15       ENUMERATED {n1, n2, n3, n4}             OPTIONAL,
    requiredNrofCoolDownSubframes-r15     ENUMERATED {n1, n2, n3, n4}             OPTIONAL
}
RegisteredMME ::=                         SEQUENCE {
    plmn-Identity                         PLMN-Identity                           OPTIONAL,
    mmegi                                 BIT STRING (SIZE (16)),
    mmec                                  MMEC
}
-- ASN1STOP
```

END OF EXAMPLE

Providing the Temporary Number of Subframes after Connection Establishment

Another way in which the UE may provide the indication of the temporary number of subframes is by sending an RRC message when the RRC connection has already been established. One candidate message where this info can be sent is the UE Assistance information-message. Sending the information in this message allows the information to be updated, i.e., the UE can update the temporary number as channel conditions change over time. Below is an example of how the embodiment can be implemented in the Long Term Evolution (LTE) RRC specification where the changes compared to the current specification are shown with underlined text.

```
BEGINNING OF EXAMPLE
5.6.10.2  Initiation
A UE capable of providing power preference indications in RRC_CONNECTED may initiate the
procedure in several cases including upon being configured to provide power preference
indications and upon change of power preference. A UE capable of providing SPS
assistance information in RRC_CONNECTED may initiate the procedure in several cases
including upon being configured to provide SPS assistance information and upon change of
SPS assistance information.
A UE capable of providing delay budget report in RRC_CONNECTED may initiate the
procedure in several cases, including upon being configured to provide delay budget
report and upon change of delay budget preference.
A UE capable of CE mode and providing maximum PDSCH/PUSCH bandwidth preference in
RRC_CONNECTED may initiate the procedure upon being configured to provide maximum
PDSCH/PUSCH bandwidth preference and/or upon change of maximum PDSCH/PUSCH bandwidth
preference.
Upon initiating the procedure, the UE shall:
1>  if configured to provide power preference indications:
    2>  if the UE did not transmit a UEAssistanceInformation message with
        powerPrefIndication since it was configured to provide power preference indications;
        or
    2>  if the current power preference is different from the one indicated in the last
transmission of the UEAssistanceInformation message and timer T340 is not running:
            3>  initiate transmission of the UEAssistanceInformation message in accordance
                with 5.6.10.3;
1>  if configured to provide maximum PDSCH/PUSCH bandwidth preference:
    2>  if the UE did not transmit a UEAssistanceInformation message with bw-Preference
        since it was configured to provide maximum PDSCH/PUSCH bandwidth preference; or:
    2>  if the current maximum PDSCH/PUSCH bandwidth preference is different from the one
        indicated in the last transmission of the UEAssistanceInformation message and timer
        T341 is not running;
            3>  initiate transmission of the UEAssistanceInformation message in accordance
                with 5.6.10.3;
1>  if configured to provide SPS assistance information:
    2>  if the UE did not transmit a UEAssistanceInformation message with sps-
        AssistanceInformation since it was configured to provide SPS assistance information;
        or
    2>  if the current SPS assistance information is different from the one indicated in
        the last transmission of the UEAssistanceInformation message:
            3>  initiate transmission of the UEAssistanceInformation message in accordance
                with 5.6.10.3;
1>  if configured to report RLM events:
    2>  if "early-out-of-sync" event has been detected and T343 is not running; or:
    2>  if "early-in-sync" event has been detected and T344 is not running:
            3>  initiate transmission of the UEAssistanceInformation message in accordance
                with 5.6.10.3;
1>  if configured to provide delay budget report:
    2>  if the UE did not transmit a UEAssistanceInformation message with
``` delayBudgetReport since it was configured to provide delay budget report; or
2> if the current delay budget is different from the one indicated in the last transmission of the UEAssistanceInformation message and timer T342 is not running:
3> initiate transmission of the UEAssistanceInformation message in accordance with 5.6.10.3;
1> if configured to provide reporting for number of cool-down and warm-up subframes:
2> if the UE did not transmit a UEAssistanceInformation message with coolDownWarmUpSubframesReporting since it was configured to provide reporting for number of cool-down and warm-up subframes and the current number of required cool-down subframes or the current number of required warm-up subframes is different than indicated in UE capabilities; or
2> if the current number of required cool-down subframes or current number of required warm-up subframes is different from the one indicated in the last transmission of the UEAssistanceInformation message and timer TXXX is not running:
3> initiate transmission of the UEAssistanceInformation message in accordance with 5.6.10.3;
5.6.10.3    Actions related to transmission of UEAssistanceInformation message
The UE shall set the contents of the UEAssistanceInformation message for power preference indications:
1> if configured to provide power preference indication and if the UE prefers a configuration primarily optimised for power saving:
2> set powerPrefIndication to lowPowerConsumption;
1> else if configured to provide power preference indication:
2> start or restart timer T340 with the timer value set to the powerPrefIndicationTimer;
2> set powerPrefIndication to normal;
The UE shall set the contents of the UEAssistanceInformation message for SPS assistance information:
1> if configured to provide SPS assistance information:
2> if there is any traffic for V2X sidelink communication which needs to report SPS assistance information:
3> include trafficPatternInfoListSL in the UEAssistanceInformation message;
2> if there is any traffic for uplink communication which needs to report SPS assistance information:
3> include trafficPatternInfoListUL in the UEAssistanceInformation message;
The UE shall set the contents of the UEAssistanceInformation message for bandwidth preference indications:
1> start timer T341 with the timer value set to the bw-PreferenceIndicationTimer;
1> set bw-Preference to its preferred configuration;
The UE shall set the contents of the UEAssistanceInformation message for delay budget report:
1> if configured to provide delay budget report:
2> if the UE prefers an adjustment in the connected mode DRX cycle length:
3> set delayBudgetReport to type1 according to a desired value;
2> else if the UE prefers coverage enhancement configuration change:
3> set delayBudgetReport to type2 according to a desired value;
2> start or restart timer T342 with the timer value set to the delayBudgetReportingProhibitTimer;
The UE shall set the contents of the UEAssistanceInformation message for the RLM report:
1> if T314 has expired:
2> set rlm-event to earlyOutOfSync;
2> start timer T343 with the timer value set to the rlmReportTimer:
1> if T315 has expired:
2> set rlm-event to earlyInSync;
2> start timer T344 with the timer value set to the rlmReportTimer:
2> if configured to report rlmReportRep-MPDCCH:
3> set excessRep-MPDCCH to the value indicated by lower layers;
The UE shall set the contents of the UEAssistanceInformation message for required cool-down and warm-up delay report:
1> if configured to provide the cool-down and warm-up delay report:
2> if the UE has not indicated a different number of required cool-down subframes and current number of required cool-down subframes for the UE is different compared to the number indicated in UE capabilities, or
2> if the UE has indicated a different number of required cool-down subframes compared to the number indicated in UE capabilities and the current number of required cool-down subframes are different than previously indicated:
3> include and set numberOfCoolDownSubframes to the number of currently required cool down subframes;
2> if the UE has not indicated a different number of required warm-up subframes and current number of required warm-up subframes for the UE is different compared to the number indicated in UE capabilities, or
2> if the UE has indicated a different number of required warm-up subframes compared to the number indicated in UE capabilities and the current number of required warm-up subframes are different than previously indicated:
3> include and set numberOfWarmUpSubframes to the number of currently required warm up subframes;
2> start or restart timer TXXX with the timer value set to the coolDownWarmUpReportingProhibitTimer;

-continued

The UE shall submit the UEAssistanceInformation message to lower layers for transmission.
NOTE 1: It is up to UE implementation when and how to trigger SPS assistance information.
NOTE 2: It is up to UE implementation to set the content of trafficPatternInfoListSL and trafficPatternInfoListUL.
NOTE 3: Traffic patterns for different Destination Layer 2 IDs are provided in different entries in trafficPatternInfoListSL.
- UEAssistanceInformation
The UEAssistanceInformation message is used for the indication of UE assistance information to the eNB.
Signalling radio bearer: SRB1
RLC-SAP: AM
Logical channel: DCCH
Direction: UE to E-UTRAN
UEAssistanceInformation message
-- ASN1START

```
UEAssistanceInformation-r11 ::=            SEQUENCE {
    criticalExtensions                     CHOICE {
        c1                                     CHOICE {
            UEAssistanceInformation-r11            UEAssistanceInformation-r11-IEs,
            spare3 NULL, spare2 NULL, spare1 NULL
        },
        criticalExtensionsFuture               SEQUENCE { }
    }
}
UEAssistanceInformation-r11-IEs ::=        SEQUENCE {
    powerPrefIndication-r11                    ENUMERATED   {normal, lowPowerConsumption}
    OPTIONAL,
    lateNonCriticalExtension                   OCTET STRING
    OPTIONAL,
    nonCriticalExtension                       UEAssistanceInformation-v1430-IEs
    OPTIONAL
}
UEAssistanceInformation-v1430-IEs ::=      SEQUENCE {
    bw-Preference-r14                          BW-Preference-r14                    OPTIONAL,
    sps-AssistanceInformation-r14              SEQUENCE {
        trafficPatternInfoListSL-r14               TrafficPatternInfoList-r14      OPTIONAL,
        trafficPatternInfoListUL-r14               TrafficPatternInfoList-r14      OPTIONAL
    }           OPTIONAL,
    rlm-Report-r14                             SEQUENCE {
        rlm-Event-r14                              ENUMERATED {earlyOutOfSync, earlyInSync},
        excessRep-MPDCCH-r14                       ENUMERATED {excessRep1, excessRep2}
        OPTIONAL
    }
    OPTIONAL,
    delayBudgetReport-r14                      DelayBudgetReport-r14
    OPTIONAL,
    nonCriticalExtension                       UEAssistanceInformation-v1500-IEs
    OPTIONAL
}
UEAssistanceInformation-v1500-IEs ::=      SEQUENCE    {
    warmUpCoolDownSubframeReport-r15           WarmUpCoolDownSubframeReport-r15
    OPTIONAL,
    nonCriticalExtension           SEQUENCE { }
    OPTIONAL
}
BW-Preference-r14 ::= SEQUENCE {
    dl-Preference-r14                  ENUMERATED   {mhz1dot4, mhz5, mhz20 }
    OPTIONAL,
    ul-Preference-r14                  ENUMERATED   {mhz1dot4, mhz5}                OPTIONAL
}
TrafficPatternInfoList-r14 ::= SEQUENCE (SIZE (1..maxTrafficPattern-r14)) OF TrafficPatternInfo-r14
TrafficPatternInfo-r14 ::= SEQUENCE {
    trafficPeriodicity-r14                 ENUMERATED {
                                               sf20, sf50, sf100, sf200, sf300, sf400,
sf500,
                                               sf600, sf700, sf800, sf900, sf1000},
    timingOffset-r14                       INTEGER (0..10239),
    priorityInfoSL-r14                     SL-Priority-r13
    OPTIONAL,
    logicalChannelIdentityUL-r14           INTEGER (3..10)
    OPTIONAL,
    messageSize-r14                        BIT STRING (SIZE (6))
}
DelayBudgetReport-r14::=           CHOICE {
    type1                              ENUMERATED {
```

```
                                      msMinus1280, msMinus640, msMinus320, msMinus160,
                                      msMinus80, msMinus60, msMinus40, msMinus20, ms0,
ms20,                                       ms40, ms60, ms80, ms160, ms320,
ms640, ms1280},
    type2                        ENUMERATED {
                                      msMinus192, msMinus168,msMinus144, msMinus120,
                                      msMinus96, msMinus72, msMinus48, msMinus24, ms0,
ms24,                                       ms48, ms72, ms96, ms120, ms144,
ms168, ms192}
}
WarmUpCoolDownSubframeReport-r15 ::= SEQUENCE {
    requiredNrofWarmUpSubframes-r15          ENUMERATED {n1, n2, n3, n4}    OPTIONAL,
    requiredNrofCoolDownSubframes-r15        ENUMERATED {n1, n2, n3, n4}    OPTIONAL
}
-- ASN1STOP
                                        END OF EXAMPLE
```

UE Signals the Information about WU/CD Subframes Needed in Neighboring Cells According to another aspect of this embodiment, the UE also determines the number of required WU and CD subframes needed in one or more neighboring cells. This is reported to the serving cell so that the serving eNB can determine the needed number of required WU and CD subframes for the UE if the UE were to be served by such a neighbor cell.

Whether the UE performs and/or reports measurements of the number of needed WU and CD subframes for neighbor cells may depend on network configuration. For example, the eNB may configure the UE whether to do this or not. One example way of configuring this is as part of the measurement configuration, e.g., in the measurement object (measObject as defined in LTE RRC specifications), in the reporting configuration (reportConfig as defined in LTE RRC specifications), etc.

The information about the number of needed WU and CD subframes needed by the UE for the neighbor cells may be sent from the serving eNB to a candidate target eNB, i.e., the eNB to which the UE may be handed over. This information can be sent to the target node as part of the signalling used to request the handover.

Figure 6:
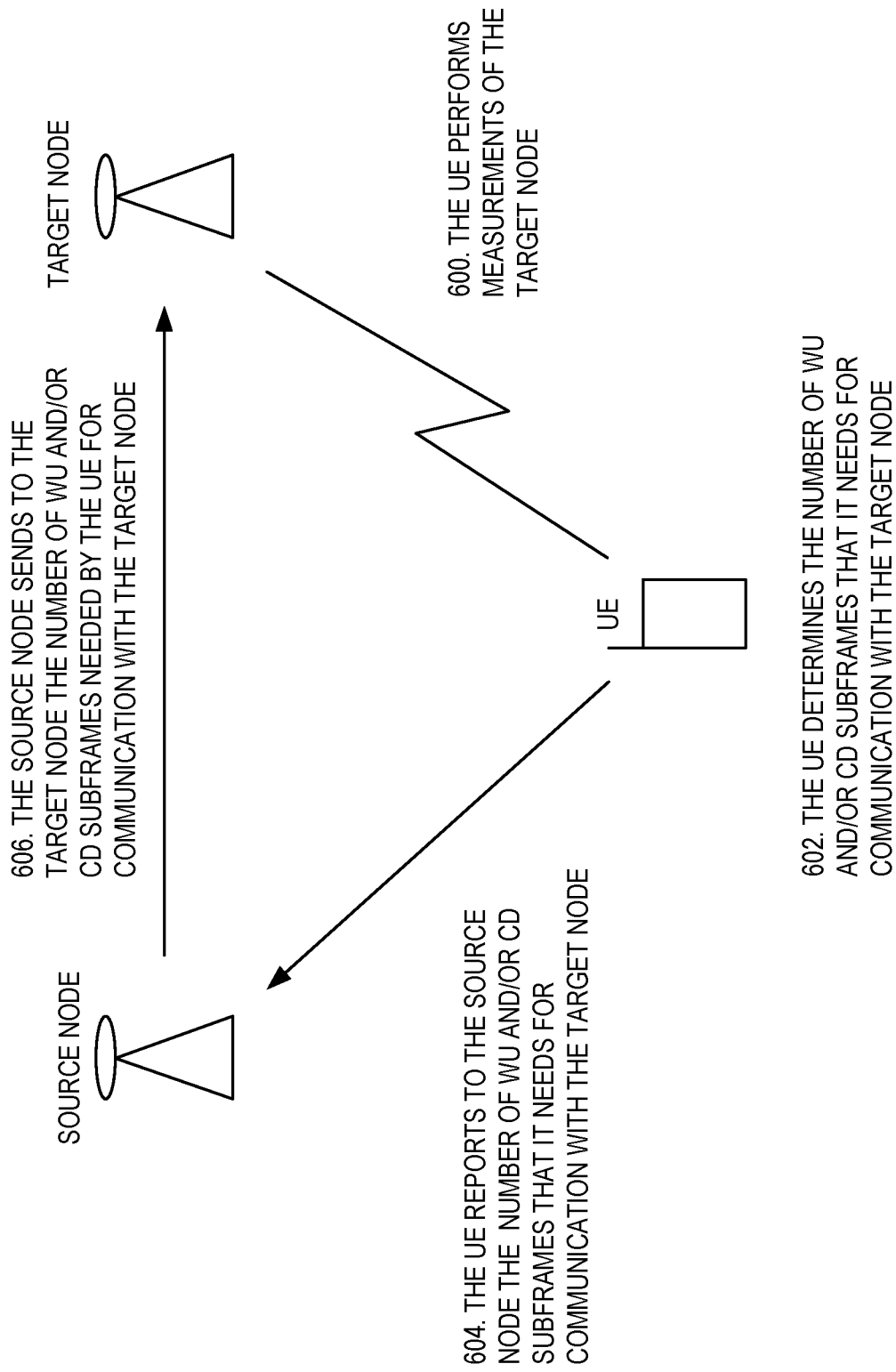
FIG. 6 illustrates an embodiment in which the number of WU and CD subframes needed by the UE is provided to a neighbor cell.

FIG. 6 illustrates an embodiment in which the number of WU and CD subframes needed by the UE is provided to a neighbor cell. At step 600, the UE performs measurements of the target node. At step 602, the UE determines the number of needed WU and/or CD subframes needed for the target node. At step 604, this information is then reported by the UE to the source node. At step 606, the source network node then sends information about the number of WU/CD subframes to the target node.

This embodiment has the benefit that the target node can know the number of needed WU and CD subframes for a UE before the UE has performed a handover to the target node. This information can then be used by the target node to modify its behavior such as adapt the number of subframes in which it shall send RSs over FL2 in the cell bandwidth.

Another possibility is that the target node considers the information when determining whether or not to accept the handover of the UE. For example, if the UE requires more WU and CD subframes compared to corresponding thresholds, the target node may reject the handover.

According to yet another aspect of this embodiment, the UE reports the needed number of WU and CD subframes to the target cell after the handover has been performed (and in this case the target node would have become the serving network node (e.g., eNB)).

One way in which the measurements of the number of needed WU and CD subframes are initiated can be based on a request from the target node, i.e., that the target node requests the UE to perform such measurements.

Another possibility is that these types of measurements, and reporting thereof, are initiated by the UE when (or shortly before/after) a handover is initiated. The UE may then be able to provide the measurements to the target node shortly after the handover has been initiated, for example, when connecting to the target node (details of this has been described above) or after the connection has been established to the target.

Second Embodiment: Method in Network Node of Using the Number of WU/CD Subframes Received from UE In this embodiment, the network node determines a certain number (K) of WU time resources and/or a certain number (L) of CD time resources in which the network node shall transmit the RS (e.g., CRS) at least within the second frequency location (FL2) (e.g., a UE bandwidth, cell bandwidth, etc.).

The network node determines the parameters K and L (e.g., the number of WU and/or CD time resources) by considering at least the received information related to the SAC (e.g., parameters M and N) from the UE (as described in the first embodiment, above). This is explained with a few examples below:

In one example, the network node determines the values of K and L corresponding to the parameters M and N respectively, e.g., K=M and L=N. In this example, the network node fully follows the UE's recommendations regarding the values of M and N.

In yet another example, the network node determines the values of K and L by applying an operation on the received parameters M and N, respectively, e.g., K=M+$\Delta 1$ and L=N+$\Delta 2$. The values of $\Delta 1$ and $\Delta 2$ can be positive or negative. For example, the network node adapts the received values of M and N based on available resources in the base station (e.g., transmit power, etc.). In yet another example, the network node adapts the received values of M and N based on interference in the network (e.g., $\Delta 1$ and/or $\Delta 2$ are $-1$ if interference is above a threshold, e.g., total received power at the UE is more than $-80$ decibel-milliwatts (dBm), etc.).

In yet another example, the network node determines the values of K and L based on the received parameters M and N from a plurality of UEs in the same cell. In one example, K is based on the average value of M received from two or more UEs and/or L is based on the average value of N received from two or more UEs. In another example, K is based on the maximum value of M received from two or more UEs and/or L is based on the maximum value of N received from two or more UEs. In yet another example, K is based on the minimum value of M received from two or more UEs and/or L is based on the minimum value of N received from two or more UEs.

In yet another example, the network node determines the values of K and L based on the activity state (e.g., active time of UE receiver) of UEs served in the cell. This may be done by adapting K and L by considering only the UEs which are expected to monitor the preamble and/or postamble. For example, assume the network node serves two UEs (UE A and UE B) where UE A requires 5 WU and 4 CD subframes and UE B requires 3 WU and 2 CD subframes, but if UE A is currently not expected to be awake and/or expected to become awake, meaning that only UE B is expected to monitor the associated preamble and/or postamble, the eNB may determine value K and L only considering UE B. It could in this case mean that the network node would use only 3 WU subframes and 2 CD subframes since UE A is not expected to monitor these subframes. This has the benefit that the eNB may refrain from transmitting the RS in FL2 in unnecessary subframes (which will not be used by any UE).

The network node, after determining the values of K and L, uses them for performing one or more operational tasks. Examples of such tasks are:

- configuring K and/or L number of WU and/or CD time resources respectively in a cell. In these time resources (e.g., subframes) the network node transmits the RS (e.g., CRS) in FL2 in the cell (e.g., over full bandwidth of the serving cell of the UE).
- adapting the DRX configuration, e.g., depending on the values of K and L. For example, if K and/or L are above a certain threshold then the network node may reconfigure the DRX cycle length and/or the ON duration of the DRX.
- Transmitting the determined values of K and/or L to another node.
- Adapting scheduling of signals in Uplink (UL) and/or in DL to the UE.

Third Embodiment: Method in Network Node of Determining and Transmitting Number of WU/CD Subframes to UE According to a third embodiment, the network node based on one or more criteria determines a certain number (K) of WU time resources and/or a certain number (L) of CD time resources in which the network node shall transmit the RS (e.g., CRS) at least within the second frequency location (FL2) (e.g., UE bandwidth, cell bandwidth, etc.). Examples of criteria for determining the values of K and L (as part of the SAC) are the same as used by the UE in the first embodiment described above. Therefore, the examples related to the UE method of determining the SAC information (e.g., parameters M and N) described above also apply for the network node. This means the network node can apply the same mechanism as used by the UE for deriving the parameters K and L.

The network node may also use additional criteria for determining the values of K and L. Examples of additional criteria are available or current resources in the cell. Examples of resources are transmit power, available or unused subframes (not currently scheduled, etc.), interference at the UEs in the cell, etc. For example, the network node can determine the interference in the cell based on one or more metrics, e.g., by receiving signal quality measurement results from the UE, based on information about transmit power used in neighboring cells, etc. For example, if the transmit power in one or more neighboring cell is above a threshold (e.g., more than 40 dBm), then the network node may assume that the interference in the cell is high; otherwise it may assume that the interference in the cell is considered to be low. In yet another example, if the signal quality measurement result received from the UE is above a threshold (e.g., more than −3 dB), then the network node may assume that the interference in the cell is low; otherwise it may assume that the interference in the cell is high. If the interference is low, then the network can determine smaller values of K and/or L, e.g., the SAC configuration #0 in Table 2. This is because under lower interference the UE can perform synchronization with regard to the serving cell using a fewer number of WU and CD subframes. But if the interference is high then the network can determine larger values of K and/or L, e.g., the SAC configuration #1 in Table 2. This is because under higher interference the UE received signal quality is below the threshold. In this case, the UE needs a larger number of WU and CD subframes for performing synchronization with regard to the serving cell.

In yet another aspect of this embodiment, the network node determines the composite values in terms of a number (K') of WU time resources and a number (L') of CD time resources, based on both i) the information about the SAC received from the UE (in the first embodiment) and ii) the information about the SAC obtained by the network node (as described above in this embodiment). For example, assume that the UE receives the values of M and N from the UE as part of the SAC information. The network node further determines the values of K and L autonomously as described above. Then the network node further determines the composite values of K' based on M and K, and L' based on N and L. The determination can be based on a function. Examples of functions are average, minimum, maximum, etc., as shown below.

K'=f(M, K) e.g., K'=MEAN (M, K); K'=MIN (M, K), etc.
L'=h(N, L) e.g., L'=MEAN (N, L); L'=MIN (N, L), etc.

The network node then configures the UE with determined values of K and/or L (or K' and/or L'), e.g., by transmitting information related to K and/or L (or K' and/or L') via RRC signaling. The network node can use the same signaling mechanism as used by the UE for transmitting information about the SAC (e.g., M and N parameters) to the network node (as described above). Therefore, the signaling principles and examples described above for the UE (from the UE to the network node) also apply to the signaling of information about K and/or L (or K' and/or L') (from network node to the UE).

The network node also transmits the RS in the determined time resources K and/or L (or K' and/or L') within at least FL2 in the bandwidth of the serving cell of the UE. As described earlier, these time resources occur before and after the UE receiver's active time (e.g., K subframes before ON duration and L subframes after ON duration; or K' subframes before ON duration and L' subframes after ON duration). The network node continues transmitting RS in the deter-

Figure 8:
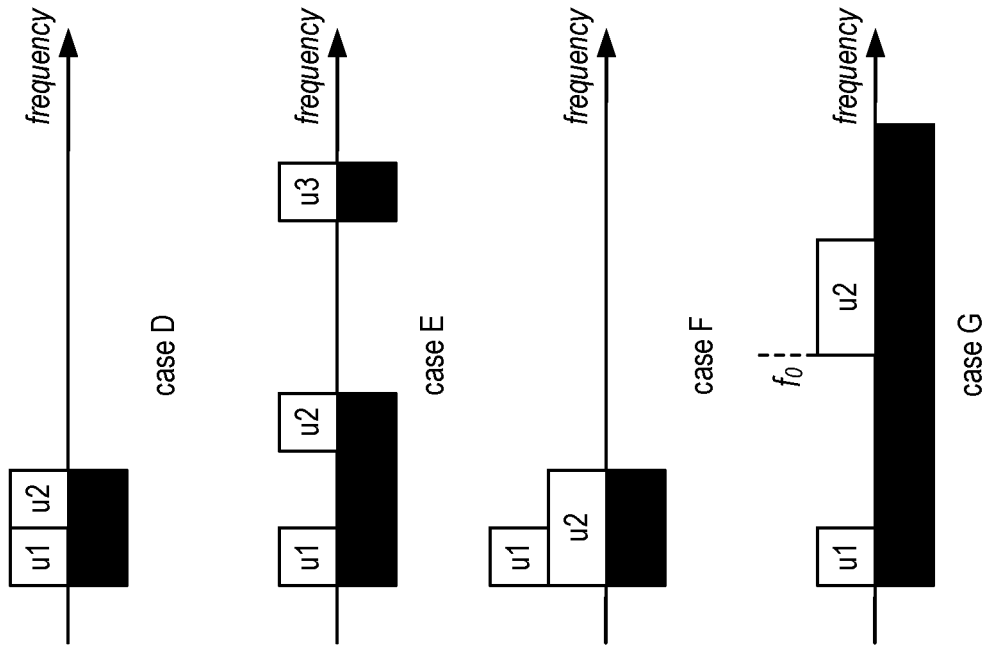
FIG. 8 illustrates determining common frequency resources for a common SAC based on multiple SACs according to some embodiments disclosed herein.
Figure 7:
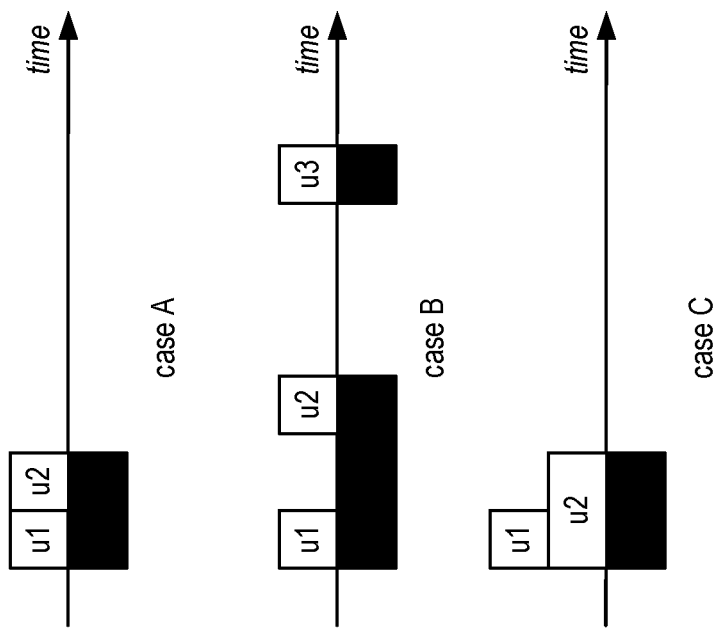
FIG. 7 illustrates determining common time resources for a common Supplementary Activity Configuration (SAC) based on multiple SACs according to some embodiments disclosed herein.

Fourth Embodiment: Method in a Network Node for Configuring Common SAC for Multiple UEs In a fourth embodiment, a network node obtains the information about the SAC for two or more UEs (e.g., based on the previous embodiments) and configures the necessary RSs to be used by the multiple UEs (i.e., a common SAC). The network node may also inform UEs about the decided RS configuration, e.g., via dedicated, multicast or broadcast (e.g., system information) signaling. FIGS. 7 and 8 illustrate determining a common SAC for UEs u1, u2, and u3 using different techniques. FIG. 7 illustrates different ways to define a common SAC with regards to time resources and FIG. 8 illustrates different ways to define a common SAC with regards to frequency resources. The individual UE-specific resources are shown as unfilled rectangles labeled with the identity of the UE (e.g., u1, u2, or u3) and the common SAC is shown as a filled rectangle or rectangles.

FIG. 7 illustrates determining common time resources for a common SAC based on multiple SACs.

FIG. 8 illustrates determining common frequency resources for a common SAC based on multiple SACs.

The common SAC may be determined based on applying a function to the multiple SACs for the same/similar UE operation type and/or overlapping time/frequency resources. Examples of the function include: a union of resources in time (case A) or frequency (case D); a maximum span, e.g., allocate a set of contiguous in time DL subframes to comprise SACs from the multiple UEs even if the SACs are not adjacent in time (case B) or frequency (case E) but closer to each other than a threshold; the maximum of the SAC length in time (case C) or frequency (case F) of overlapping SACs (e.g., the longest WU or CD period over the same bandwidth, the union or the maximum span of the bandwidth comprising multiple SACs, the maximum bandwidth of the overlapping in frequency SACs, etc. Similar principles can be used for determining common frequency resources or the combination of common time and frequency resources. When deciding common frequency resources, the decision may also account for a system center frequency $f_0$ and the common resources are allocated symmetrically with respect to $f_0$ to comprise multiple SACs (case G). In one example, a common SAC based on multiple SACs comprises a SAC with a common set of time and/or frequency resources. In another example, a common SAC is always a superset of different SACs received from multiple UEs.

For each UE, the time resources associated with a SAC may be implicitly determined by the type of the UE operation or purpose of the SAC, etc. (e.g., a SAC associated with DRX ON periods would be located prior to DRX ON so the purpose determines the exact SAC location in time). In another example, the time resources may be explicitly comprised in a SAC (e.g., not only length of WU but also its location within a subframe may be indicated).

In yet another example, the network node may also delay, postpone, or trigger earlier certain types of UE operation to reduce or minimize the number of cell resources occupied by common SACs over a longer time period by aligning certain UE operations in time.

Figure 9:
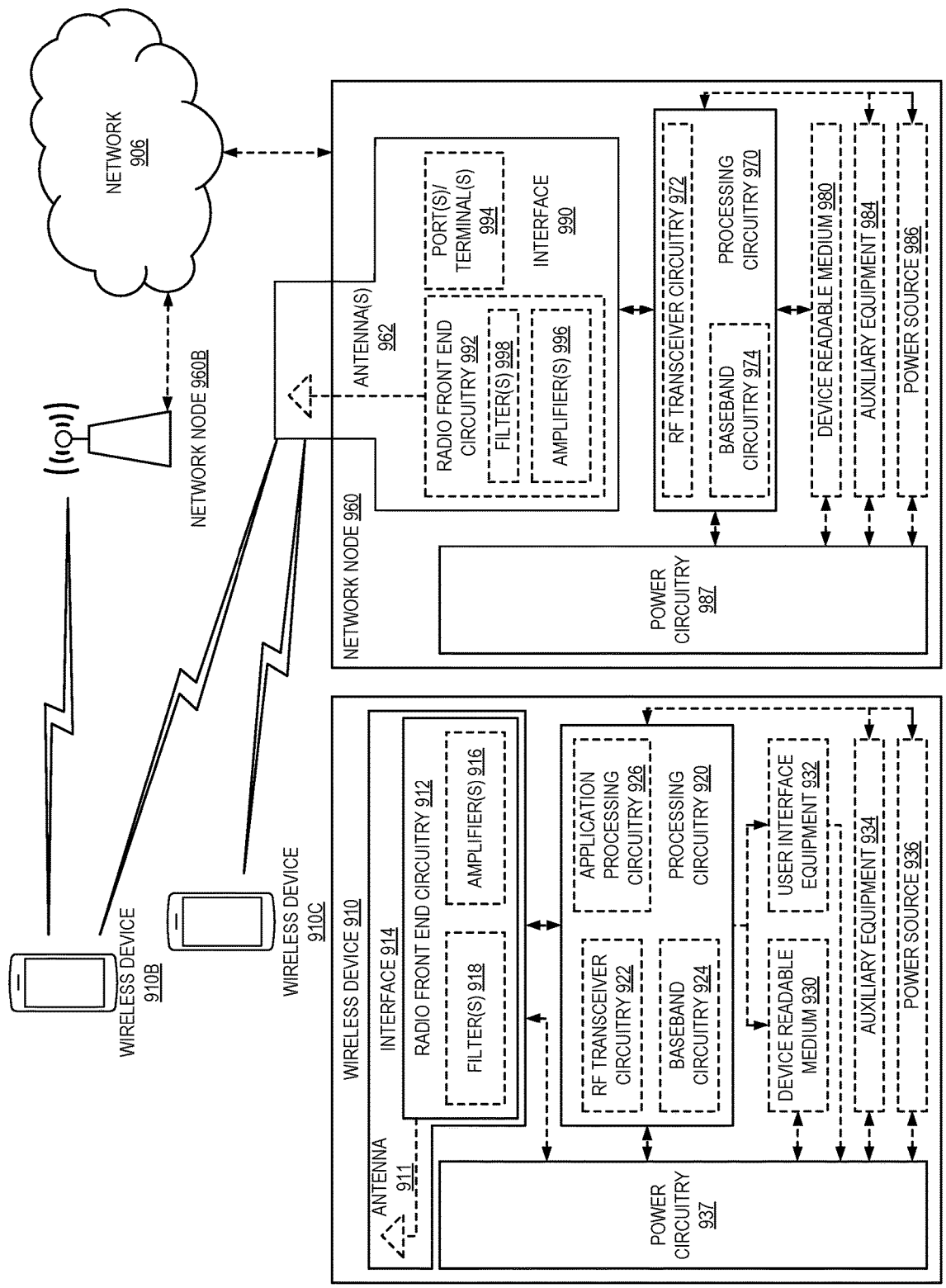
FIG. 9 illustrates an exemplary wireless network according to some embodiments disclosed herein.

FIG. 9. Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts a network 906, network nodes 960 and 960B, and Wireless Devices (WDs) 910, 910B, and 910C. In practice, a wireless network may further include any additional elements suitable to support communication between wireless devices or between a wireless device and another communication device, such as a landline telephone, a service provider, or any other network node or end device. Of the illustrated components, the network node 960 and the WD 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

The network 906 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 960 and the WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, APs (e.g., radio APs), base stations (e.g., radio base stations, Node Bs, eNBs, and New Radio (NR) Node Bs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or RRUs, sometimes referred to as RRHs. Such RRUs may or may not be integrated with an antenna as an antenna integrated radio. Parts of a distributed radio base station may also be referred to as nodes in a Distributed Antenna System (DAS). Yet further examples of network nodes include MSR equipment such as MSR base stations, network controllers such as RNCs or BSCs, BTSs, transmission points, transmission nodes, MCEs, core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, the network node 960 includes processing circuitry 970, a device readable medium 980, an interface 990, auxiliary equipment 984, a power source 986, power circuitry 987, and an antenna 962. Although the network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 960 are depicted as single boxes located within a larger box, or nested within multiple boxes, in practice, a network node may comprise multiple different physical components that make up a single illustrated component (e.g., the device readable medium 980 may comprise multiple separate hard drives as well as multiple Random Access Memory (RAM) modules).

Similarly, the network node 960 may be composed of multiple physically separate components (e.g., a Node B component and a RNC component, or a BTS component and a BSC component, etc.), which may each have their own respective components. In certain scenarios in which the network node 960 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 960 may be configured to support multiple Radio Access Technologies (RATs). In such embodiments, some components may be duplicated (e.g., a separate device readable medium 980 for the different RATs) and some components may be reused (e.g., the same antenna 962 may be shared by the RATs). The network node 960 may also include multiple sets of the various illustrated components for different wireless technologies integrated into the network node 960, such as, for example, GSM, Wideband Code Division Multiple Access (WCDMA), LTE, NR, WiFi, or Bluetooth wireless technologies. These wireless technologies may be integrated into the same or a different chip or set of chips and other components within the network node 960.

The processing circuitry 970 is configured to perform any determining, calculating, or similar operations (e.g., certain obtaining operations) described herein as being provided by a network node. These operations performed by the processing circuitry 970 may include processing information obtained by the processing circuitry 970 by, for example, converting the obtained information into other information, comparing the obtained information or converted information to information stored in the network node, and/or performing one or more operations based on the obtained information or converted information, and as a result of said processing making a determination.

The processing circuitry 970 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 960 components, such as the device readable medium 980, network node 960 functionality. For example, the processing circuitry 970 may execute instructions stored in the device readable medium 980 or in memory within the processing circuitry 970. Such functionality may include providing any of the various wireless features, functions, or benefits discussed herein. In some embodiments, the processing circuitry 970 may include a System on a Chip (SOC).

In some embodiments, the processing circuitry 970 may include one or more of RF transceiver circuitry 972 and baseband processing circuitry 974. In some embodiments, the RF transceiver circuitry 972 and the baseband processing circuitry 974 may be on separate chips (or sets of chips), boards, or units, such as radio units and digital units. In alternative embodiments, part or all of the RF transceiver circuitry 972 and the baseband processing circuitry 974 may be on the same chip or set of chips, boards, or units.

In certain embodiments, some or all of the functionality described herein as being provided by a network node, base station, eNB, or other such network device may be performed by the processing circuitry 970 executing instructions stored on the device readable medium 980 or memory within the processing circuitry 970. In alternative embodiments, some or all of the functionality may be provided by the processing circuitry 970 without executing instructions stored on a separate or discrete device readable medium, such as in a hard-wired manner. In any of those embodiments, whether executing instructions stored on a device readable storage medium or not, the processing circuitry 970 can be configured to perform the described functionality. The benefits provided by such functionality are not limited to the processing circuitry 970 alone or to other components of the network node 960, but are enjoyed by the network node 960 as a whole, and/or by end users and the wireless network generally.

The device readable medium 980 may comprise any form of volatile or non-volatile computer readable memory including, without limitation, persistent storage, solid state memory, remotely mounted memory, magnetic media, optical media, RAM, Read Only Memory (ROM), mass storage media (for example, a hard disk), removable storage media (for example, a flash drive, a compact disc or a Digital Video Disc (DVD)), and/or any other volatile or non-volatile, non-transitory device readable and/or computer-executable memory devices that store information, data, and/or instructions that may be used by the processing circuitry 970. The device readable medium 980 may store any suitable instructions; data or information, including a computer program; software; an application including one or more of logic, rules, code, tables, etc.; and/or other instructions capable of being executed by the processing circuitry 970 and utilized by the network node 960. The device readable medium 980 may be used to store any calculations made by the processing circuitry 970 and/or any data received via the interface 990. In some embodiments, the processing circuitry 970 and the device readable medium 980 may be considered to be integrated.

The interface 990 is used in the wired or wireless communication of signaling and/or data between the network node 960, a network 906, and/or WDs 910. As illustrated, the interface 990 comprises port(s)/terminal(s) 994 to send and receive data, for example, to and from the network 906 over a wired connection. The interface 990 also includes radio front end circuitry 992 that may be coupled to, or in certain embodiments a part of, the antenna 962. The radio front end circuitry 992 comprises filters 998 and amplifiers 996. The radio front end circuitry 992 may be connected to the antenna 962 and the processing circuitry 970. The radio front end circuitry 992 may be configured to condition signals communicated between the antenna 962 and the processing circuitry 970. The radio front end circuitry 992 may receive digital data that is to be sent out to other network nodes or WDs via a wireless connection. The radio front end circuitry 992 may convert the digital data into a radio signal having the appropriate channel and bandwidth parameters using a combination of the filters 998 and/or the amplifiers 996. The radio signal may then be transmitted via the antenna 962. Similarly, when receiving data, the antenna 962 may collect radio signals which are then converted into digital data by the radio front end circuitry 992. The digital data may be passed to the processing circuitry 970. In other embodiments, the interface 990 may comprise different components and/or different combinations of components.

In certain alternative embodiments, the network node 960 may not include separate radio front end circuitry 992; instead, the processing circuitry 970 may comprise radio front end circuitry and may be connected to the antenna 962 without separate radio front end circuitry 992. Similarly, in some embodiments, all or some of the RF transceiver circuitry 972 may be considered a part of the interface 990. In still other embodiments, the interface 990 may include the one or more ports or terminals 994, the radio front end circuitry 992, and the RF transceiver circuitry 972 as part of a radio unit (not shown), and the interface 990 may communicate with the baseband processing circuitry 974, which is part of a digital unit (not shown).

The antenna 962 may include one or more antennas, or antenna arrays, configured to send and/or receive wireless signals. The antenna 962 may be coupled to the radio front end circuitry 992 and may be any type of antenna capable of transmitting and receiving data and/or signals wirelessly. In some embodiments, the antenna 962 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 962 may be separate from the network node 960 and may be connectable to the network node 960 through an interface or port.

The antenna 962, the interface 990, and/or the processing circuitry 970 may be configured to perform any receiving operations and/or certain obtaining operations described herein as being performed by a network node. Any information, data, and/or signals may be received from a WD, another network node, and/or any other network equipment. Similarly, the antenna 962, the interface 990, and/or the processing circuitry 970 may be configured to perform any transmitting operations described herein as being performed by a network node. Any information, data, and/or signals may be transmitted to a WD, another network node, and/or any other network equipment.

The power circuitry 987 may comprise, or be coupled to, power management circuitry and is configured to supply the components of the network node 960 with power for performing the functionality described herein. The power circuitry 987 may receive power from the power source 986. The power source 986 and/or the power circuitry 987 may be configured to provide power to the various components of the network node 960 in a form suitable for the respective components (e.g., at a voltage and current level needed for each respective component). The power source 986 may either be included in, or be external to, the power circuitry 987 and/or the network node 960. For example, the network node 960 may be connectable to an external power source (e.g., an electricity outlet) via an input circuitry or interface such as an electrical cable, whereby the external power source supplies power to the power circuitry 987. As a further example, the power source 986 may comprise a source of power in the form of a battery or battery pack which is connected to, or integrated in, the power circuitry 987. The battery may provide backup power should the external power source fail. Other types of power sources, such as photovoltaic devices, may also be used.

Alternative embodiments of the network node 960 may include additional components beyond those shown in FIG. 9 that may be responsible for providing certain aspects of the network node's functionality, including any of the functionality described herein and/or any functionality necessary to support the subject matter described herein. For example, the network node 960 may include user interface equipment to allow input of information into the network node 960 and to allow output of information from the network node 960. This may allow a user to perform diagnostic, maintenance, repair, and other administrative functions for the network node 960.

As used herein, WD refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, LEE, LME, a smart device, a wireless CPE, a vehicle mounted wireless terminal device, etc. A WD may support D2D communication, for example, by implementing a 3G Partnership Project (3GPP) standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an IoT scenario, a WD may represent a machine or other device that performs monitoring and/or measurements, and transmits the results of such monitoring and/or measurements to another WD and/or a network node. The WD may in this case be a M2M device, which may in a 3GPP context be referred to as a MTC device. As one particular example, the WD may be a UE implementing the 3GPP NB-IoT standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 9, a WD 910 includes an antenna 911, an interface 914, processing circuitry 920, a device readable medium 930, user interface equipment 932, auxiliary equipment 934, a power source 936, and power circuitry 937. The WD 910 may include multiple sets of one or more of the illustrated components for different wireless technologies supported by the WD 910, such as, for example, GSM, WCDMA, LTE, NR, WiFi, WiMAX, or Bluetooth wireless technologies, just to mention a few. These wireless technologies may be integrated into the same or different chips or set of chips as other components within the WD 910.

The antenna 911 may include one or more antennas or antenna arrays configured to send and/or receive wireless signals and is connected to the interface 914. In certain alternative embodiments, the antenna 911 may be separate from the WD 910 and be connectable to the WD 910 through an interface or port. The antenna 911, the interface 914, and/or the processing circuitry 920 may be configured to perform any receiving or transmitting operations described herein as being performed by a WD. Any information, data, and/or signals may be received from a network node and/or another WD. In some embodiments, radio front end circuitry and/or the antenna 911 may be considered an interface.

As illustrated, the interface 914 comprises radio front end circuitry 912 and the antenna 911. The radio front end circuitry 912 comprises one or more filters 918 and amplifiers 916. The radio front end circuitry 912 is connected to the antenna 911 and the processing circuitry 920 and is configured to condition signals communicated between the antenna 911 and the processing circuitry 920. The radio front end circuitry 912 may be coupled to or be a part of the antenna 911. In some embodiments, the WD 910 may not include separate radio front end circuitry 912; rather, the processing circuitry 920 may comprise radio front end circuitry and may be connected to the antenna 911. Similarly, in some embodiments, some or all of RF transceiver circuitry 922 may be considered a part of the interface 914. The radio front end circuitry 912 may receive digital data that is to be sent out to other network nodes or WDs via a wireless connection. The radio front end circuitry 912 may convert the digital data into a radio signal having the appropriate channel and bandwidth parameters using a combination of the filters 918 and/or the amplifiers 916. The radio signal may then be transmitted via the antenna 911. Similarly, when receiving data, the antenna 911 may collect radio signals which are then converted into digital data by the radio front end circuitry 912. The digital data may be passed to the processing circuitry 920. In other embodiments, the interface 914 may comprise different components and/or different combinations of components.

The processing circuitry 920 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 910 components, such as the device readable medium 930, WD 910 functionality. Such functionality may include providing any of the various wireless features or benefits discussed herein. For example, the processing circuitry 920 may execute instructions stored in the device readable medium 930 or in memory within the processing circuitry 920 to provide the functionality disclosed herein.

As illustrated, the processing circuitry 920 includes one or more of the RF transceiver circuitry 922, baseband processing circuitry 924, and application processing circuitry 926. In other embodiments, the processing circuitry 920 may comprise different components and/or different combinations of components. In certain embodiments, the processing circuitry 920 of the WD 910 may comprise a SOC. In some embodiments, the RF transceiver circuitry 922, the baseband processing circuitry 924, and the application processing circuitry 926 may be on separate chips or sets of chips. In alternative embodiments, part or all of the baseband processing circuitry 924 and the application processing circuitry 926 may be combined into one chip or set of chips, and the RF transceiver circuitry 922 may be on a separate chip or set of chips. In still alternative embodiments, part or all of the RF transceiver circuitry 922 and the baseband processing circuitry 924 may be on the same chip or set of chips, and the application processing circuitry 926 may be on a separate chip or set of chips. In yet other alternative embodiments, part or all of the RF transceiver circuitry 922, the baseband processing circuitry 924, and the application processing circuitry 926 may be combined in the same chip or set of chips. In some embodiments, the RF transceiver circuitry 922 may be a part of the interface 914. The RF transceiver circuitry 922 may condition RF signals for the processing circuitry 920.

In certain embodiments, some or all of the functionality described herein as being performed by a WD may be provided by the processing circuitry 920 executing instructions stored on the device readable medium 930, which in certain embodiments may be a computer-readable storage medium. In alternative embodiments, some or all of the functionality may be provided by the processing circuitry 920 without executing instructions stored on a separate or discrete device readable storage medium, such as in a hard-wired manner. In any of those particular embodiments, whether executing instructions stored on a device readable storage medium or not, the processing circuitry 920 can be configured to perform the described functionality. The benefits provided by such functionality are not limited to the processing circuitry 920 alone or to other components of the WD 910, but are enjoyed by the WD 910 as a whole, and/or by end users and the wireless network generally.

The processing circuitry 920 may be configured to perform any determining, calculating, or similar operations (e.g., certain obtaining operations) described herein as being performed by a WD. These operations, as performed by the processing circuitry 920, may include processing information obtained by the processing circuitry 920 by, for example, converting the obtained information into other information, comparing the obtained information or converted information to information stored by the WD 910, and/or performing one or more operations based on the obtained information or converted information, and as a result of said processing making a determination.

The device readable medium 930 may be operable to store a computer program; software; an application including one or more of logic, rules, code, tables, etc.; and/or other instructions capable of being executed by the processing circuitry 920. The device readable medium 930 may include computer memory (e.g., RAM or ROM), mass storage media (e.g., a hard disk), removable storage media (e.g., a compact disc or a DVD), and/or any other volatile or non-volatile, non-transitory device readable and/or computer executable memory devices that store information, data, and/or instructions that may be used by the processing circuitry 920. In some embodiments, the processing circuitry 920 and the device readable medium 930 may be considered to be integrated.

The user interface equipment 932 may provide components that allow for a human user to interact with the WD 910. Such interaction may be of many forms, such as visual, audial, tactile, etc. The user interface equipment 932 may be operable to produce output to the user and to allow the user to provide input to the WD 910. The type of interaction may vary depending on the type of user interface equipment 932 installed in the WD 910. For example, if the WD 910 is a smart phone, the interaction may be via a touch screen; if the WD 910 is a smart meter, the interaction may be through a screen that provides usage (e.g., the number of gallons used) or a speaker that provides an audible alert (e.g., if smoke is detected). The user interface equipment 932 may include input interfaces, devices and circuits, and output interfaces, devices and circuits. The user interface equipment 932 is configured to allow input of information into the WD 910, and is connected to the processing circuitry 920 to allow the processing circuitry 920 to process the input information. The user interface equipment 932 may include, for example, a microphone, a proximity or other sensor, keys/buttons, a touch display, one or more cameras, a Universal Serial Bus (USB) port, or other input circuitry. The user interface equipment 932 is also configured to allow output of information from the WD 910 and to allow the processing circuitry 920 to output information from the WD 910. The user interface equipment 932 may include, for example, a speaker, a display, vibrating circuitry, a USB port, a headphone interface, or other output circuitry. Using one or more input and output interfaces, devices, and circuits of the user interface equipment 932, the WD 910 may communicate with end users and/or the wireless network, and allow them to benefit from the functionality described herein.

The auxiliary equipment 934 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 934 may vary depending on the embodiment and/or scenario.

The power source 936 may, in some embodiments, be in the form of a battery or battery pack. Other types of power sources, such as an external power source (e.g., an electricity outlet), photovoltaic devices, or power cells may also be used. The WD 910 may further comprise the power circuitry 937 for delivering power from the power source 936 to the various parts of the WD 910 which need power from the power source 936 to carry out any functionality described or indicated herein. The power circuitry 937 may in certain embodiments comprise power management circuitry. The power circuitry 937 may additionally or alternatively be operable to receive power from an external power source, in which case the WD 910 may be connectable to the external power source (such as an electricity outlet) via input circuitry or an interface such as an electrical power cable. The power circuitry 937 may also in certain embodiments be operable to deliver power from an external power source to the power source 936. This may be, for example, for the charging of the power source 936. The power circuitry 937 may perform any formatting, converting, or other modification to the power from the power source 936 to make the power suitable for the respective components of the WD 910 to which power is supplied.

Figure 10:
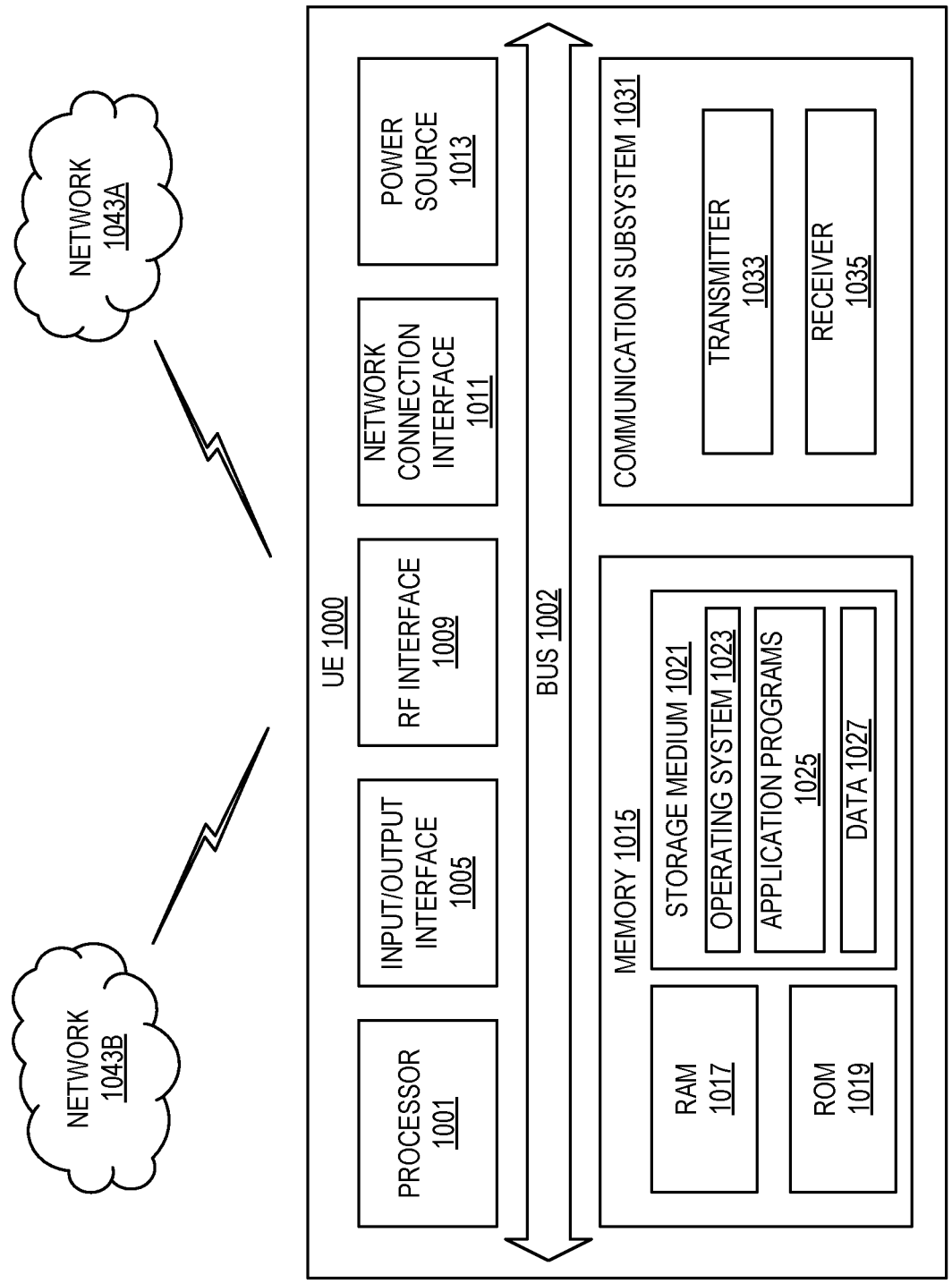
FIG. 10 illustrates one embodiment of a UE according to some embodiments disclosed herein.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 10200 may be any UE identified by 3GPP, including a NB-IoT UE, a MTC UE, and/or an enhanced MTC (eMTC) UE. The UE 1000, as illustrated in FIG. 10, is one example of a WD configured for communication in accordance with one or more communication standards promulgated by 3GPP, such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, the UE 1000 includes processing circuitry 1001 that is operatively coupled to an input/output interface 1005, an RF interface 1009, a network connection interface 1011, memory 1015 including RAM 1017, ROM 1019, and a storage medium 1021 or the like, a communication subsystem 1031, a power source 1013, and/or any other component, or any combination thereof. The storage medium 1021 includes an operating system 1023, an application program 1025, and data 1027. In other embodiments, the storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, the processing circuitry 1001 may be configured to process computer instructions and data. The processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored programs, general purpose processors, such as a microprocessor or DSP, together with appropriate software; or any combination of the above. For example, the processing circuitry 1001 may include two CPUs. Data may be information in a form suitable for use by a computer.

In the depicted embodiment, the input/output interface 1005 may be configured to provide a communication interface to an input device, output device, or input and output device. The UE 1000 may be configured to use an output device via the input/output interface 1005. An output device may use the same type of interface port as an input device. For example, a USB port may be used to provide input to and output from the UE 1000. The output device may be a speaker, a sound card, a video card, a display, a monitor, a printer, an actuator, an emitter, a smartcard, another output device, or any combination thereof. The UE 1000 may be configured to use an input device via the input/output interface 1005 to allow a user to capture information into the UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, the RF interface 1009 may be configured to provide a communication interface to RF components such as a transmitter, a receiver, and an antenna. The network connection interface 1011 may be configured to provide a communication interface to a network 1043A. The network 1043A may encompass wired and/or wireless networks such as a LAN, a WAN, a computer network, a wireless network, a telecommunications network, another like network or any combination thereof. For example, the network 1043A may comprise a WiFi network. The network connection interface 1011 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 1011 may implement receiver and transmitter functionality appropriate to the communication network links (e.g., optical, electrical, and the like). The transmitter and receiver functions may share circuit components, software, or firmware, or alternatively may be implemented separately.

The RAM 1017 may be configured to interface via a bus 1002 to the processing circuitry 1001 to provide storage or caching of data or computer instructions during the execution of software programs such as the operating system, application programs, and device drivers. The ROM 1019 may be configured to provide computer instructions or data to the processing circuitry 1001. For example, the ROM 1019 may be configured to store invariant low-level system code or data for basic system functions such as basic Input and Output (I/O), startup, or reception of keystrokes from a keyboard that are stored in a non-volatile memory. The Storage medium 1021 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 1021 may be configured to include the operating system 1023, the application program 1025 such as a web browser application, a widget or gadget engine, or another application, and the data file 1027. The storage medium 1021 may store, for use by the UE 1000, any of a variety of various operating systems or combinations of operating systems.

The storage medium 1021 may be configured to include a number of physical drive units, such as a Redundant Array of Independent Disks (RAID), a floppy disk drive, flash memory, a USB flash drive, an external hard disk drive, a thumb drive, a pen drive, a key drive, a High-Density Digital Versatile Disc (HD-DVD) optical disc drive, an internal hard disk drive, a Blu-Ray optical disc drive, a Holographic Digital Data Storage (HDDS) optical disc drive, an external mini-Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 1021 may allow the UE 1000 to access computer-executable instructions, application programs, or the like, stored on transitory or non-transitory memory media, to off-load data or to upload data. An article of manufacture, such as one utilizing a communication system, may be tangibly embodied in the storage medium 1021, which may comprise a device readable medium.

In FIG. 10, the processing circuitry 1001 may be configured to communicate with a network 1043B using the communication subsystem 1031. The network 1043A and the network 1043B may be the same network or networks or different network or networks. The communication subsystem 1031 may be configured to include one or more transceivers used to communicate with the network 1043B. For example, the communication subsystem 1031 may be configured to include one or more transceivers used to communicate with one or more remote transceivers of another device capable of wireless communication such as another WD, UE, or base station of a Radio Access Network (RAN) according to one or more communication protocols, such as IEEE 802.10, Code Division Multiple Access (CDMA), WCDMA, GSM, LTE, Universal Terrestrial RAN (UTRAN), WiMax, or the like. Each transceiver may include a transmitter 1033 and/or a receiver 1035 to implement transmitter or receiver functionality, respectively, appropriate to the RAN links (e.g., frequency allocations and the like). Further, the transmitter 1033 and the receiver 1035 of each transceiver may share circuit components, software, or firmware, or alternatively may be implemented separately.

In the illustrated embodiment, the communication functions of the communication subsystem 1031 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 1031 may include cellular communication, WiFi communication, Bluetooth communication, and GPS communication. The network 1043B may encompass wired and/or wireless networks such as a LAN, a WAN, a computer network, a wireless network, a telecommunications network, another like network, or any combination thereof. For example, the network 1043B may be a cellular network, a WiFi network, and/or a near-field network. A power source 1013 may be configured to provide Alternating Current (AC) or Direct Current (DC) power to components of the UE 1000.

The features, benefits, and/or functions described herein may be implemented in one of the components of the UE 1000 or partitioned across multiple components of the UE 1000. Further, the features, benefits, and/or functions described herein may be implemented in any combination of hardware, software, or firmware. In one example, the communication subsystem 1031 may be configured to include any of the components described herein. Further, the processing circuitry 1001 may be configured to communicate with any of such components over the bus 1002. In another example, any of such components may be represented by program instructions stored in memory that, when executed by the processing circuitry 1001, perform the corresponding functions described herein. In another example, the functionality of any of such components may be partitioned between the processing circuitry 1001 and the communication subsystem 1031. In another example, the non-computationally intensive functions of any of such components may be implemented in software or firmware and the computationally intensive functions may be implemented in hardware.

Figure 11:
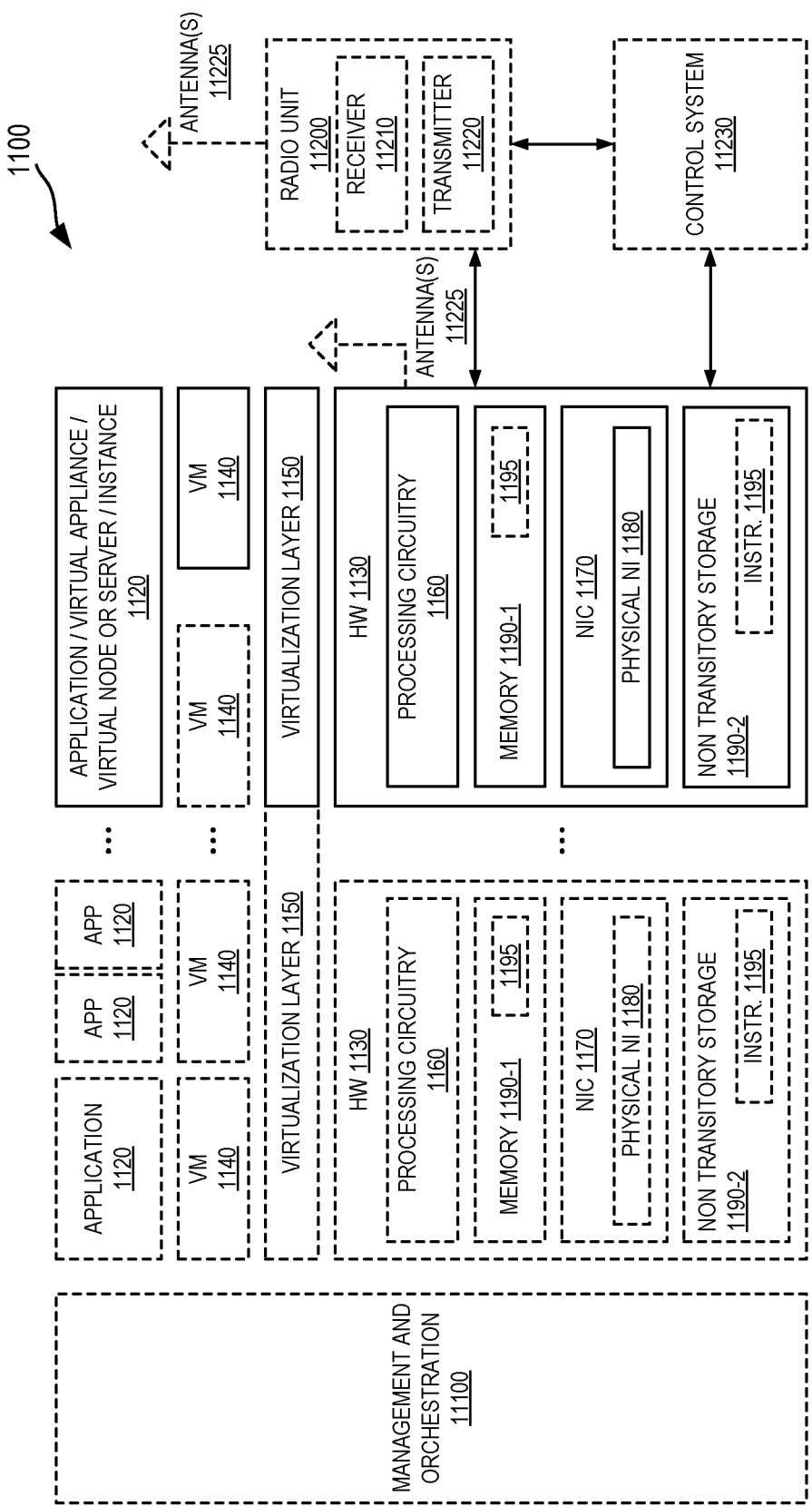
FIG. 11 is a schematic block diagram illustrating a virtualization environment in which functions implemented by some embodiments may be virtualized.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a WD, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. The applications 1120 are run in the virtualization environment 1100 which provides hardware 1130 comprising processing circuitry 1160 and memory 1190. The memory 1190 contains instructions 1195 executable by the processing circuitry 1160 whereby the application 1120 is operative to provide one or more of the features, benefits, and/or functions disclosed herein.

The virtualization environment 1100 comprises general-purpose or special-purpose network hardware devices 1130 comprising a set of one or more processors or processing circuitry 1160, which may be Commercial Off-the-Shelf (COTS) processors, dedicated ASICs, or any other type of processing circuitry including digital or analog hardware components or special purpose processors. Each hardware device 1130 may comprise memory 1190-1 which may be non-persistent memory for temporarily storing instructions 1195 or software executed by the processing circuitry 1160. Each hardware device 1130 may comprise one or more Network Interface Controllers (NICs) 1170, also known as network interface cards, which include a physical network interface 1180. Each hardware device 1130 may also include non-transitory, persistent, machine-readable storage media 1190-2 having stored therein software 1195 and/or instructions executable by the processing circuitry 1160. The software 1195 may include any type of software including software for instantiating one or more virtualization layers 1150 (also referred to as hypervisors), software to execute virtual machines 1140, as well as software allowing it to execute functions, features, and/or benefits described in relation with some embodiments described herein.

The virtual machines 1140, comprise virtual processing, virtual memory, virtual networking or interface, and virtual storage, and may be run by a corresponding virtualization layer 1150 or hypervisor. Different embodiments of the instance of virtual appliance 1120 may be implemented on one or more of the virtual machines 1140, and the implementations may be made in different ways.

During operation, the processing circuitry 1160 executes the software 1195 to instantiate the hypervisor or virtualization layer 1150, which may sometimes be referred to as a Virtual Machine Monitor (VMM). The virtualization layer 1150 may present a virtual operating platform that appears like networking hardware to the virtual machine 1140.

As shown in FIG. 11, the hardware 1130 may be a standalone network node with generic or specific components. The hardware 1130 may comprise an antenna 11225 and may implement some functions via virtualization. Alternatively, the hardware 1130 may be part of a larger cluster of hardware (e.g., such as in a data center or CPE) where many hardware nodes work together and are managed via a Management and Orchestration (MANO) 11100, which, among others, oversees lifecycle management of the applications 1120.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 1140 may be a software implementation of a physical machine that runs programs as if they were executing on a physical, non-virtualized machine. Each of the virtual machines 1140, and that part of the hardware 1130 that executes that virtual machine 1140, be it hardware dedicated to that virtual machine 1140 and/or hardware shared by that virtual machine 1140 with others of the virtual machines 1140, forms a separate Virtual Network Element (VNE).

Still in the context of NFV, Virtual Network Function (VNF) is responsible for handling specific network functions that run in one or more virtual machines 1140 on top of the hardware networking infrastructure 1130 and corresponds to the application 1120 in FIG. 11.

In some embodiments, one or more radio units 11200 that each include one or more transmitters 11220 and one or more receivers 11210 may be coupled to the one or more antennas 11225. The radio units 11200 may communicate directly with the hardware nodes 1130 via one or more appropriate network interfaces and may be used in combination with the virtual components to provide a virtual node with radio capabilities, such as a radio access node or a base station.

In some embodiments, some signaling can be effected with the use of a control system 11230, which may alternatively be used for communication between the hardware nodes 1130 and the radio unit 11200.

Figure 12:
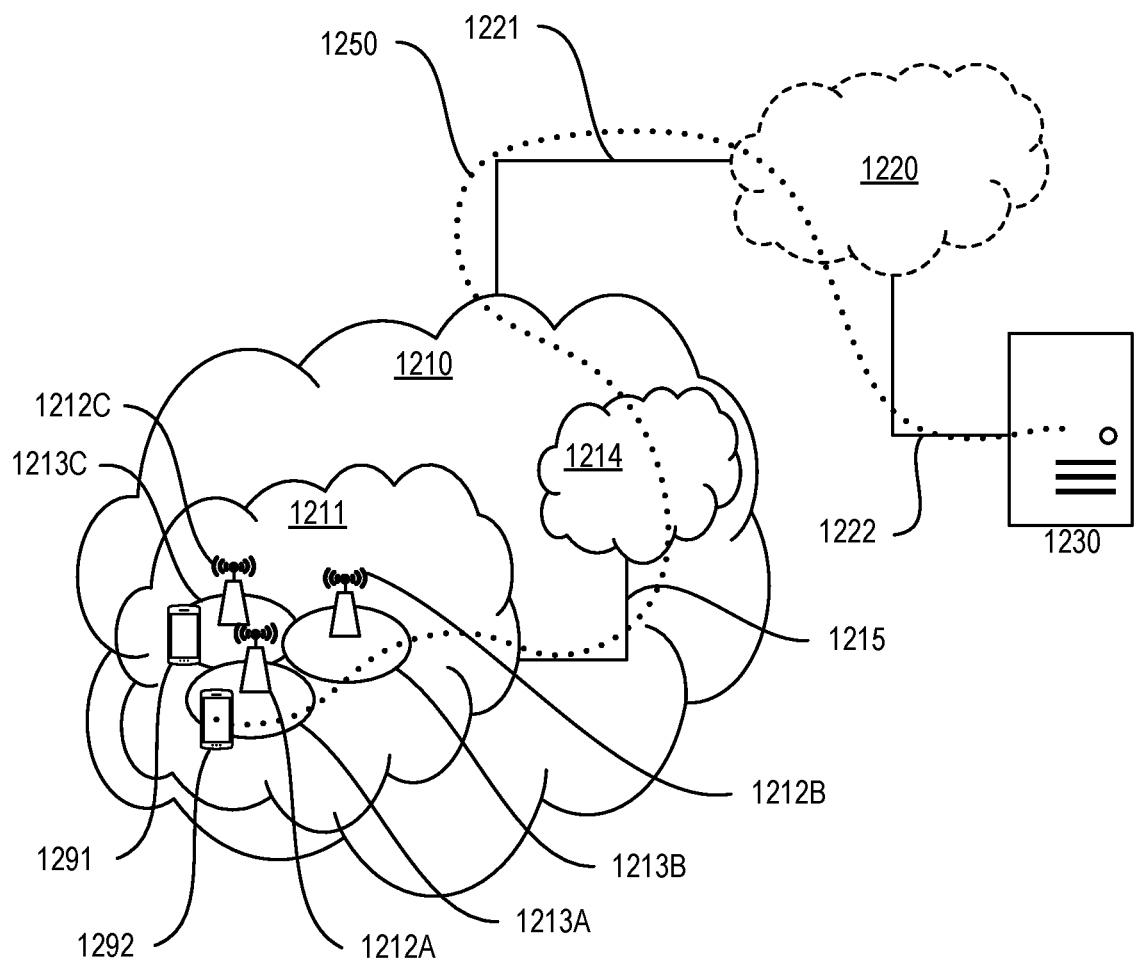
FIG. 12 illustrates a communication system including a telecommunication network according to some embodiments disclosed herein.

FIG. 12. With reference to FIG. 12, in accordance with an embodiment, a communication system includes a telecommunication network 1210, such as a 3GPP-type cellular network, which comprises an access network 1211, such as a RAN, and a core network 1214. The access network 1211 comprises a plurality of base stations 1212A, 1212B, 1212C, such as NBs, eNBs, gNBs, or other types of wireless APs, each defining a corresponding coverage area 1213A, 1213B, 1213C. Each base station 1212A, 1212B, 1212C is connectable to the core network 1214 over a wired or wireless connection 1215. A first UE 1291 located in coverage area 1213C is configured to wirelessly connect to, or be paged by, the corresponding base station 1212C. A second UE 1292 in coverage area 1213A is wirelessly connectable to the corresponding base station 1212A. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server, or as processing resources in a server farm. The host computer 1230 may be under the ownership or control of a service provider, or may be operated by the service provider or on behalf of the service provider. Connections 1221 and 1222 between telecommunication network 1210 and the host computer 1230 may extend directly from the core network 1214 to the host computer 1230 or may go via an optional intermediate network 1220. The intermediate network 1220 may be one of, or a combination of more than one of, a public, private, or hosted network; the intermediate network 1220, if any, may be a backbone network or the Internet; in particular, the intermediate network 1220 may comprise two or more sub-networks (not shown).

The communication system of FIG. 12 as a whole enables connectivity between the connected UEs 1291, 1292 and the host computer 1230. The connectivity may be described as an Over-the-Top (OTT) connection 1250. The host computer 1230 and the connected UEs 1291, 1292 are configured to communicate data and/or signaling via the OTT connection 1250, using the access network 1211, the core network 1214, any intermediate network 1220, and possible further infrastructure (not shown) as intermediaries. The OTT connection 1250 may be transparent in the sense that the participating communication devices through which the OTT connection 1250 passes are unaware of routing of UL and DL communications. For example, the base station 1212 may not or need not be informed about the past routing of an incoming DL communication with data originating from the host computer 1230 to be forwarded (e.g., handed over) to a connected UE 1291. Similarly, the base station 1212 need not be aware of the future routing of an outgoing UL communication originating from the UE 1291 towards the host computer 1230.

Figure 13:
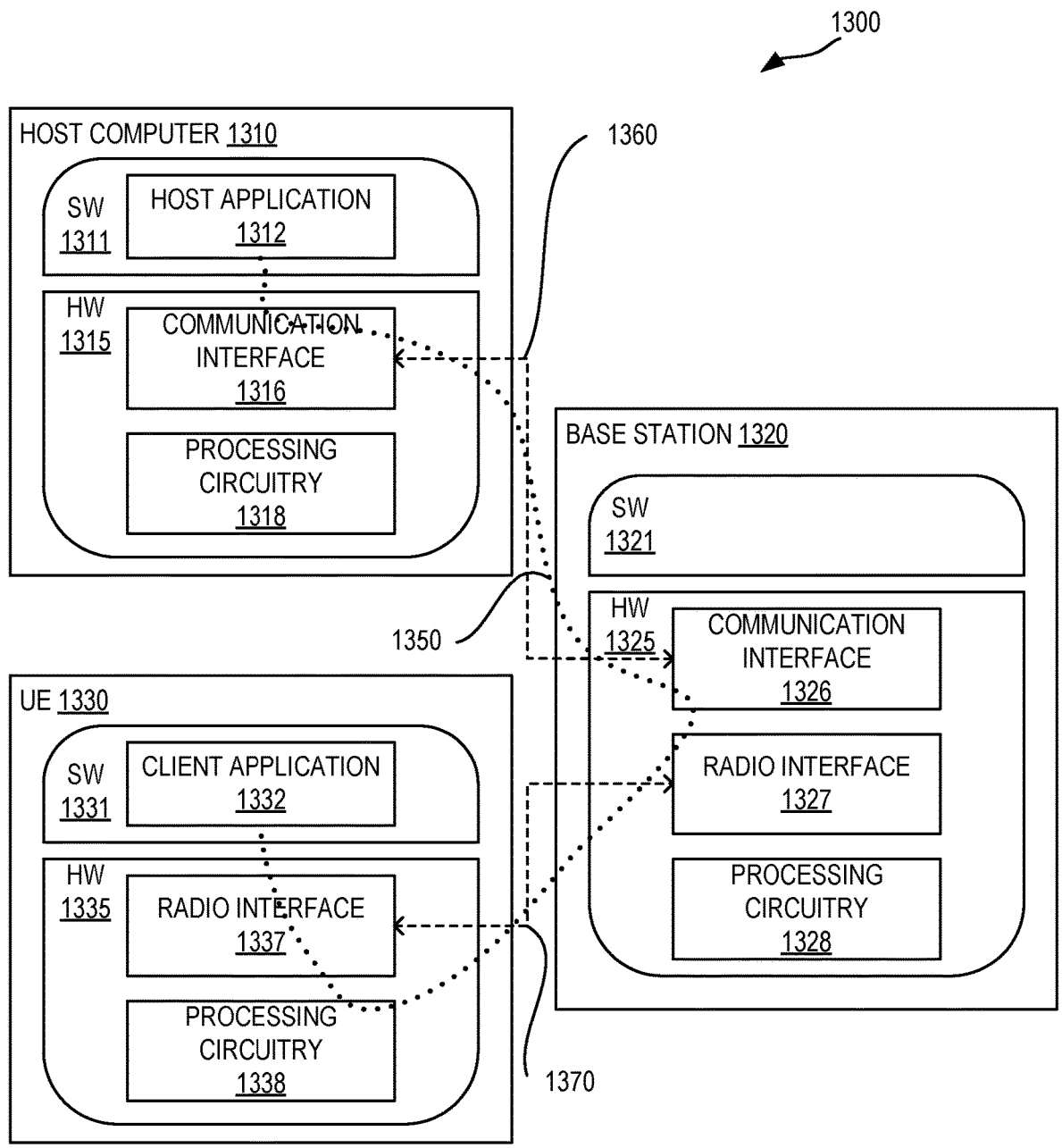
FIG. 13 illustrates a communication system according to some embodiments disclosed herein.

FIG. 13. Example implementations, in accordance with an embodiment, of the UE, base station, and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, ASICs, FPGAs, or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as a UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with the UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes processing circuitry 1328, which may comprise one or more programmable processors, ASICs, FPGAs, or combinations of these (not shown) adapted to execute instructions. The base station 1320 further has software 1321 stored internally or accessible via an external connection.

The communication system 1300 further includes the UE 1330 already referred to. The UE's 1330 hardware 1335 may include a radio interface 1337 configured to set up and maintain a wireless connection 1370 with a base station serving a coverage area in which the UE 1330 is currently located. The hardware 1335 of the UE 1330 further includes processing circuitry 1338, which may comprise one or more programmable processors, ASICs, FPGAs, or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, the executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

It is noted that the host computer 1310, the base station 1320, and the UE 1330 illustrated in FIG. 13 may be similar or identical to the host computer 1230, one of the base stations 1212A, 1212B, 1212C, and one of the UEs 1291, 1292 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the UE 1330 via the base station 1320 without explicit reference to any intermediary devices and the precise routing of messages via these devices. The network infrastructure may determine the routing, which may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

The wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may improve the flexibility with which a base station may dynamically adjust the number of WU and CD subframes to be used during lean carrier operation and thereby provide benefits such as reduced power consumption and therefore improved battery life of wireless devices as well as reduced cell-to-cell interference resulting in better communications within each cell.

A measurement procedure may be provided for the purpose of monitoring data rate, latency, and other factors on which the one or more embodiments improve. There may further be an optional network functionality for reconfiguring the OTT connection 1350 between the host computer 1310 and the UE 1330, in response to variations in the measurement results. The measurement procedure and/or the network functionality for reconfiguring the OTT connection 1350 may be implemented in the software 1311 and the hardware 1315 of the host computer 1310 or in the software 1331 and the hardware 1335 of the UE 1330, or both. In some embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which the software 1311, 1331 may compute or estimate the monitored quantities. The reconfiguring of the OTT connection 1350 may include message format, retransmission settings, preferred routing, etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer 1310's measurements of throughput, propagation times, latency, and the like. The measurements may be implemented in that the software 1311 and 1331 causes messages to be transmitted, in particular empty or 'dummy' messages, using the OTT connection 1350 while it monitors propagation times, errors, etc.

Figure 14:
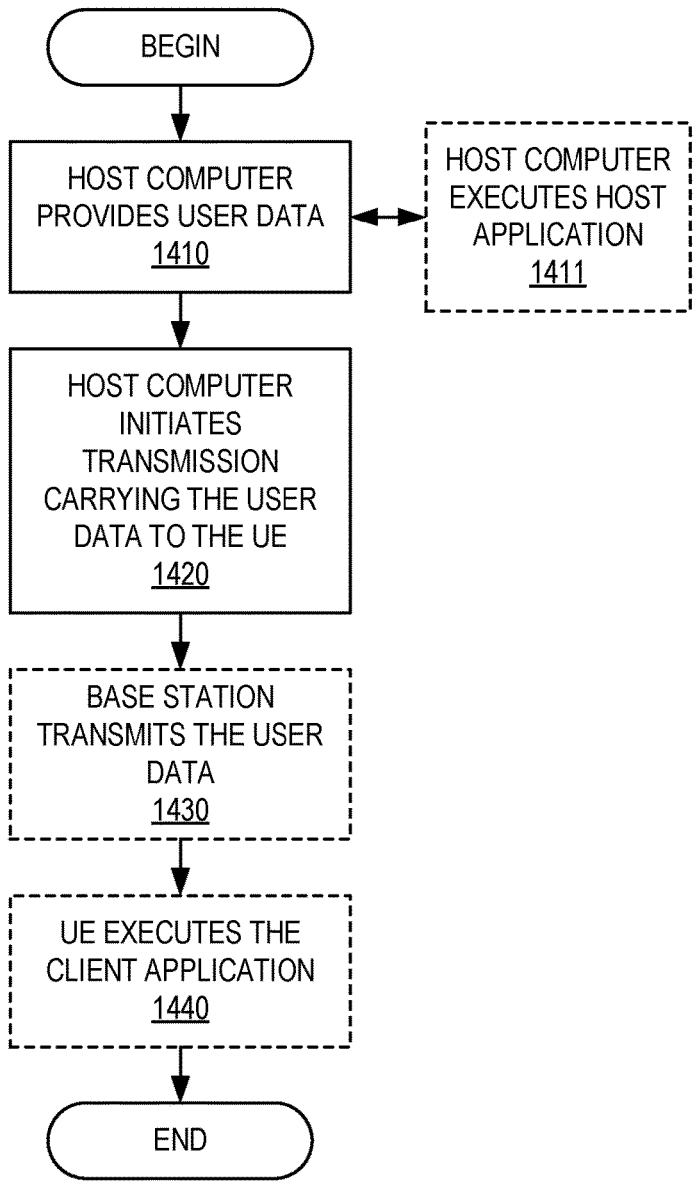
FIG. 14 is a flowchart illustrating a method implemented in a communication system according to some embodiments disclosed herein.

FIG. 14 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 14 will be included in this section. In step 1410, the host computer provides user data. In sub-step 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
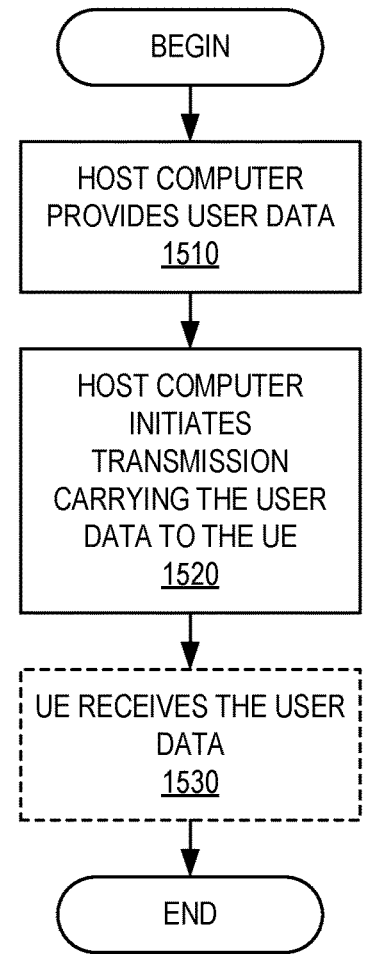
FIG. 15 is a flowchart illustrating a method implemented in a communication system according to some embodiments disclosed herein.

FIG. 15 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 15 will be included in this section. In step 1510 of the method, the host computer provides user data. In an optional sub-step (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figures 16, 17:
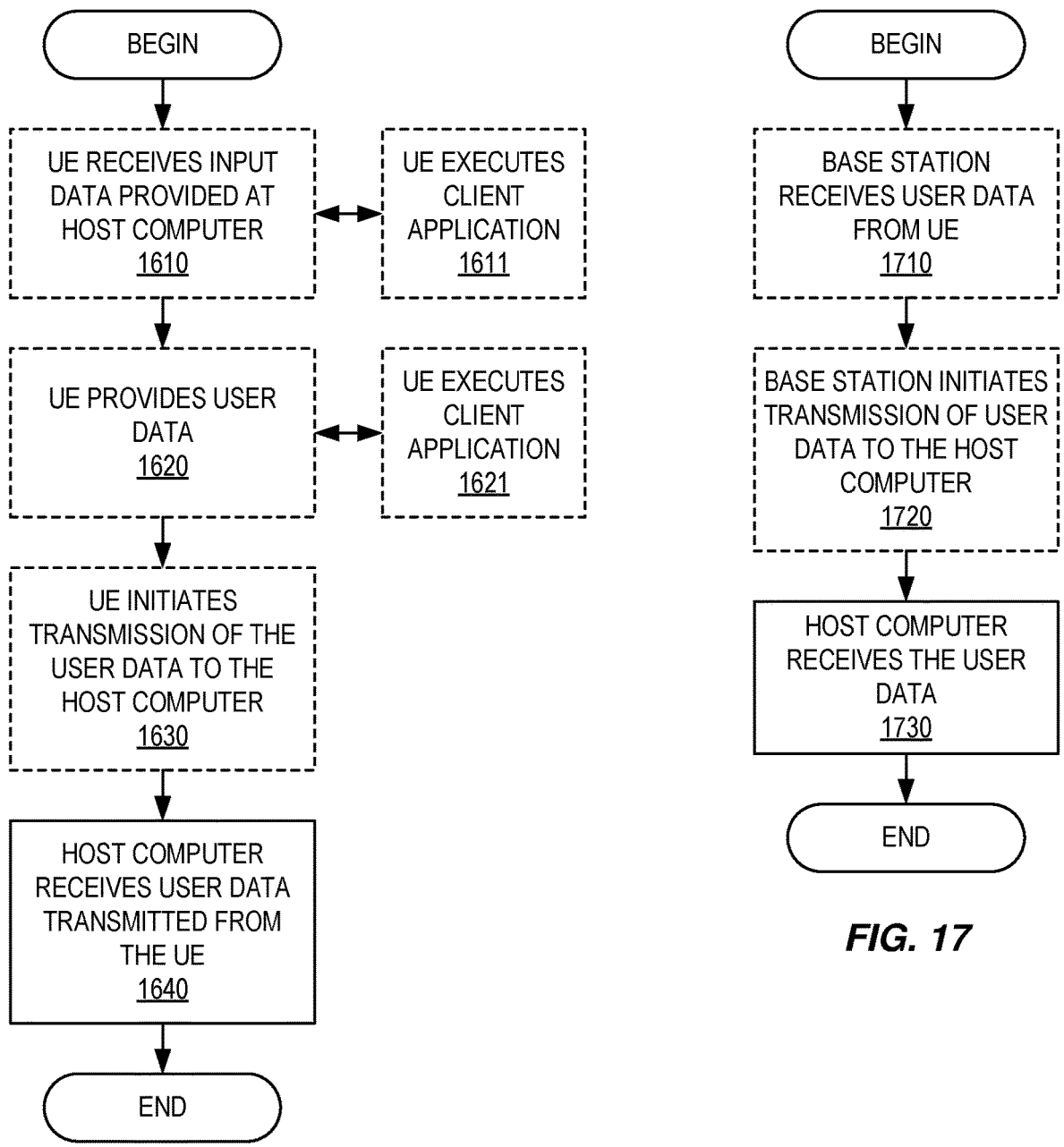
FIG. 16 is a flowchart illustrating a method implemented in a communication system according to some embodiments disclosed herein.
FIG. 17 is a flowchart illustrating a method implemented in a communication system according to some embodiments disclosed herein.

FIG. 16 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In sub-step 1621 (which may be optional) of step 1620, the UE provides the user data by executing a client application. In sub-step 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in sub-step 1630 (which may be optional), transmission of the user data to the host computer. In step 1640 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

FIG. 18 depicts a method performed by a wireless device for lean carrier operation during which CRSs are transmitted by a base station using a reduced bandwidth during an inactive time of a DRX mode of operation excluding a WU period that occurs immediately before a DRX active time and a CD period that occurs immediately after a DRX active time in accordance with particular embodiments. The method begins at step 1800 with determining a number M of subframes to comprise a WU period that occurs immediately before a DRX active time for a wireless device. Step 1802 includes determining a number N of subframes to comprise a CD period that occurs immediately after a DRX active time for a wireless device. Step 1804 includes transmitting an indication of the determined numbers M and N to a base station currently serving the wireless device.

FIG. 19 depicts a method performed by a base station for lean carrier operation during which CRSs of a cell are transmitted by the base station using a reduced bandwidth during an inactive time of a DRX mode of operation of a wireless device excluding a WU period that occurs immediately before a DRX active time and a CD period that occurs immediately after a DRX active time. The method begins at step 1900 with determining a number K of subframes to comprise a WU period that occurs immediately before a DRX active time for a wireless device. Step 1902 includes determining a number L of subframes to comprise a CD period that occurs immediately after a DRX active time for a wireless device. Step 1904 includes transmitting an indication of the determined numbers K and L to another node, which may be the wireless device or another base station, e.g., a candidate base station to be the target of a handoff of the wireless device.

Figure 20:
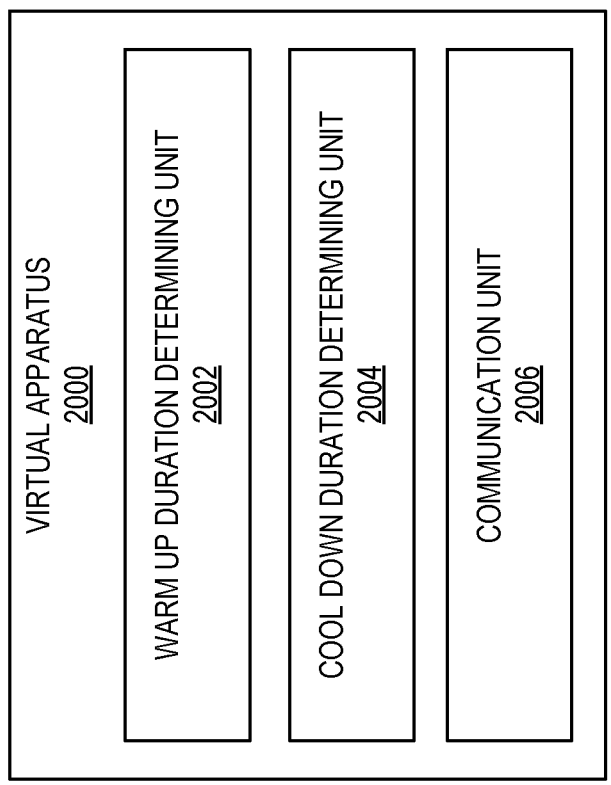
FIG. 20 illustrates a schematic block diagram of an apparatus in a wireless network according to some embodiments disclosed herein.

FIG. 20 illustrates a schematic block diagram of an apparatus 2000 in a wireless network (for example, the wireless network shown in FIG. 9). The apparatus may be implemented in a wireless device or network node (e.g., the WD 910 or the network node 960 shown in FIG. 9). The apparatus 2000 is operable to carry out the example method described with reference to FIG. 18 or FIG. 19 and possibly any other processes or methods disclosed herein. It is also to be understood that the method of FIG. 18 or FIG. 19 is not necessarily carried out solely by the apparatus 2000. At least some operations of the method can be performed by one or more other entities.

The virtual apparatus 2000 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a WU duration determining unit 2002, a CD duration determining unit 2004, a communication unit 2006, and any other suitable units of the apparatus 2000 to perform corresponding functions according one or more embodiments of the present disclosure.

As illustrated in FIG. 20, the apparatus 2000 includes a WU duration determining unit 2002, a CD duration determining unit 2004, and a communication unit 2006. The WU duration determining unit 2002 is configured to determine the duration of a WU period that occurs immediately before a DRX active time. The CD duration determining unit 2004 is configured to determine the duration of a CD period that occurs immediately after a DRX active time. The communication unit 2006 is configured to communicate an indication of the determined durations to another node, such as to a base station that is serving a wireless device or to a wireless device that is being served by a base station, or to another node in the network.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Other Embodiments

Group A Embodiments

Sending M and N (Embodiment 1)

1. A method performed by a wireless device for lean carrier operation during which CRSs, are transmitted by a base station using a reduced bandwidth during an inactive time of a DRX, mode of operation excluding a WU, period that occurs immediately before a DRX active time and a CD period that occurs immediately after a DRX active time, the method comprising: determining a number M of subframes to comprise a WU period; determining a number N of subframes to comprise a CD period; and transmitting an indication of the determined numbers M and N to a base station currently serving the wireless device.

2. The method of embodiment 1 wherein M and/or N is determined based at least in part on one or more criteria for operation of the wireless device during lean carrier operation, the criteria comprising: coverage enhancement level of the wireless device; battery life of the wireless device; required signal quality at the wireless device; required target quality at the wireless device; bandwidth of CRS during reduced bandwidth transmission; and/or DRX cycle configuration.

3. The method of embodiment 1 or 2 wherein transmitting the determined numbers M and N comprises transmitting information that defines or identifies a previously defined SAC which specifies values for M and N.

4. The method of embodiment 3 wherein the SAC specifies a bandwidth or set of frequency resources used during lean carrier operation.

5. The method of embodiment 4 wherein the SAC specifies a set of symbols or resource elements within a resource block comprised in WU and/or CD subframes.

6. The method of any of embodiments 1-3 wherein the SAC identifies one or more operations of the wireless device for which the SAC is needed.

7. The method of any of embodiments 1-6 wherein transmitting the indication of the determined numbers M and N comprises transmitting the numbers M and N.

8. The method of any of embodiments 1-6 wherein transmitting the indication of the determined numbers M and N comprises transmitting a value deltaM indicating a difference between M and a number of WU subframes currently used by the wireless device and transmitting a value deltaN indicating a difference between N and a number of CD subframes currently used by the wireless device.

Receiving K and L

9. The method of any of embodiments 1-8 further comprising receiving, by the wireless device, an indication of a number K indicating a number of subframes comprising a WU period and a number L indicating a number of subframes comprising a CD period.

10. The method of embodiment 9 wherein K may be the same or different from M and wherein L may be the same or different from N.

11. The method of embodiment 9 or 10 wherein receiving an indication of a K and L comprises receiving information that defines or identifies a previously defined SAC which specifies values for K and L.

12. The method of embodiment 11 wherein the SAC specifies a bandwidth or set of frequency resources used during lean carrier operation.

13. The method of embodiment 11 wherein the SAC specifies a set of symbols or resource elements within a resource block comprised in WU and/or CD subframes.

14. The method of embodiment 11 wherein the SAC identifies one or more operations of the wireless device for which the SAC is needed.

15. The method of embodiment 9 or 10 wherein receiving the indication of K and L comprises receiving the numbers K and L.

16. The method of embodiment 9 or 10 wherein receiving the indication of K and L comprises receiving a value deltaK indicating a difference between K and a number of WU subframes currently used by the wireless device and transmitting a value deltaL indicating a difference between L and a number of CD subframes currently used by the wireless device.

Handover Scenarios

17. The method of any of embodiments 9-16 wherein the indication of K and L is received from the base station currently serving the wireless device.

18. The method of any of embodiments 9-16 wherein the indication of K and L is received from a base station other than the base station currently serving the wireless device.

19. The method of embodiment 18 wherein the indication of K and L is received from a base station of a cell that is a candidate target for handover of the wireless device.

Group B Embodiments

Determining K and L (Embodiment 2)

20. A method performed by a base station for lean carrier operation during which CRSs of a cell are transmitted by the base station using a reduced bandwidth during an inactive time of a DRX mode of operation of a wireless device excluding a WU period that occurs immediately before a DRX active time and a CD period that occurs immediately after a DRX active time, the method comprising: determining a number K of subframes to comprise a WU period; determining a number L of subframes to comprise a CD period; and transmitting an indication of the determined numbers K and L to another node.

21. The method of embodiment 20 wherein K and/or L is determined based at least in part on an indication of parameters M and/or N, respectively, received from a wireless device, wherein M indicates a number of subframes to comprise a WU period and N indicates a number of subframes to comprise a CD period.

22. The method of embodiment 21 wherein the received indication of M and N comprises received values for M and N.

23. The method of embodiment 21 wherein the received indication of M and N comprises information that defines or identifies a previously defined SAC which specifies values for M and N.

24. The method of embodiment 22 or 23 wherein K is set to the value of M and L is set to the value of N.

25. The method of embodiment 22 or 23 wherein K and L are determined by applying an operation on the values of M and N, respectively.

26. The method of any of embodiments 21-25 comprising determining K and L based at least in part on a plurality of values of M and N respectively received from a plurality of wireless devices in the same cell.

27. The method of any of embodiments 20-26 wherein K and L are determined based at least in part on an activity state of at least one wireless device in the cell.

28. The method of any of embodiments 20-27 further comprising configuring K number of WU subframes and/or L number of CD subframes in the cell.

29. The method of any of embodiments 20-28 further comprising adapting a DRX configuration based at least in part on values of K and/or L.

30. The method of any of embodiments 20-29 further comprising adapting scheduling of UL and/or DL signals to a wireless device.

31. The method of any of embodiments 20-30 wherein transmitting an indication of the determined numbers K and L to another node comprises transmitting the indication to a wireless device.

32. The method of any of embodiments 20-31 wherein transmitting an indication of the determined numbers K and L to another node comprises transmitting the indication to another base station.

33. The method of embodiment 31 or 32 wherein transmitting the indication of the determined numbers K and L comprises transmitting K and L; or transmitting information that defines or identifies a previously defined SAC which specifies values for K and L.

Determining K and L (Embodiment 3)

34. The method of any of embodiments 20-33 wherein K and/or L is determined based at least in part on one or more criteria for operation of the wireless device during lean carrier operation, the one or more criteria comprising: coverage enhancement level of the wireless device; battery life of the wireless device; required signal quality at the wireless device; required target quality at the wireless device; bandwidth of CRS during reduced bandwidth transmission; bandwidth of CRS during non-reduced bandwidth transmission; and/or DRX cycle configuration.

35. The method of any of embodiments 20-34 wherein K and/or L is determined based at least in part on one or more characteristics of the cell, the one or more characteristics comprising: transmit power of a base station or wireless device; available or unused subframes; interference at a wireless device in the cell; received signal quality measurement results from a wireless device; transmit power used in a neighboring cell; and/or cell-to-cell interference.

Handover Scenario

36. The method of any of embodiments 20-35 wherein K and/or L is determined based on information received by the base station from another base station currently serving a wireless device that is a candidate for handover.

37. The method of embodiment 36 wherein a handover decision is based at least in part on the determined K and/or L.

38. The method of embodiment 36 or 37 wherein a composite value K' is determined based on K and a value M indicated by the wireless device and wherein a composite value L' is determined based on L and a value N indicated by the wireless device.

Configuring Common SAC (Embodiment 4)

39. The method of any of embodiments 20-38 further comprising determining K and L based at least in part on a plurality of values of M and N respectively received from a plurality of wireless devices in the same cell and determining a common SAC the accommodates RSs to be used by the plurality of wireless devices.

40. The method of embodiment 39 wherein determining the common SAC comprises performing a function on a plurality of SACs for a same or similar wireless device operation or having overlapping time and/or frequency resources.

Group C Embodiments

41. A wireless device for lean carrier operation during which CRSs are transmitted by a base station using a reduced bandwidth during an inactive time of a DRX mode of operation excluding a WU period that occurs immediately before a DRX active time and a CD period that occurs immediately after a DRX active time, the wireless device comprising: processing circuitry configured to perform any of the steps of any of the Group A embodiments; and power supply circuitry configured to supply power to the wireless device.

42. A base station for lean carrier operation during which CRSs of a cell are transmitted by the base station using a reduced bandwidth during an inactive time of a DRX mode of operation of a wireless device excluding a WU period that occurs immediately before a DRX active time and a CD period that occurs immediately after a DRX active time, the base station comprising: processing circuitry configured to perform any of the steps of any of the Group B embodiments; power supply circuitry configured to supply power to the wireless device.

43. A UE for lean carrier operation during which CRSs are transmitted by a base station using a reduced bandwidth during an inactive time of a DRX mode of operation excluding a WU period that occurs immediately before a DRX active time and a CD period that occurs immediately after a DRX active time, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

44. A communication system including a host computer comprising: processing circuitry configured to provide user data; and a communication interface configured to forward the user data to a cellular network for transmission to a UE wherein the cellular network comprises a base station having a radio interface and processing circuitry, the base station's processing circuitry configured to perform any of the steps of any of the Group B embodiments.

45. The communication system of the previous embodiment further including the base station.

46. The communication system of the previous 2 embodiments, further including the UE, wherein the UE is configured to communicate with the base station.

47. The communication system of the previous 3 embodiments, wherein: the processing circuitry of the host computer is configured to execute a host application, thereby providing the user data; and the UE comprises processing circuitry configured to execute a client application associated with the host application.

48. A method implemented in a communication system including a host computer, a base station and a UE the method comprising: at the host computer, providing user data; and at the host computer, initiating a transmission carrying the user data to the UE via a cellular network comprising the base station, wherein the base station performs any of the steps of any of the Group B embodiments.

49. The method of the previous embodiment, further comprising, at the base station, transmitting the user data.

50. The method of the previous 2 embodiments, wherein the user data is provided at the host computer by executing a host application, the method further comprising, at the UE, executing a client application associated with the host application.

51. A UE configured to communicate with a base station, the UE comprising a radio interface and processing circuitry configured to perform the method of the previous 3 embodiments.

52. A communication system including a host computer comprising: processing circuitry configured to provide user data; and a communication interface configured to forward user data to a cellular network for transmission to a UE wherein the UE comprises a radio interface and processing circuitry, the UE's components configured to perform any of the steps of any of the Group A embodiments.

53. The communication system of the previous embodiment, wherein the cellular network further includes a base station configured to communicate with the UE.

54. The communication system of the previous 2 embodiments, wherein: the processing circuitry of the host computer is configured to execute a host application, thereby providing the user data; and the UE's processing circuitry is configured to execute a client application associated with the host application.

55. A method implemented in a communication system including a host computer, a base station and a UE the method comprising: at the host computer, providing user data; and at the host computer, initiating a transmission carrying the user data to the UE via a cellular network comprising the base station, wherein the UE performs any of the steps of any of the Group A embodiments.

56. The method of the previous embodiment, further comprising at the UE, receiving the user data from the base station.

57. A communication system including a host computer comprising: communication interface configured to receive user data originating from a transmission from a UE to a base station, wherein the UE comprises a radio interface and processing circuitry, the UE's processing circuitry configured to perform any of the steps of any of the Group A embodiments.

58. The communication system of the previous embodiment, further including the UE.

59. The communication system of the previous 2 embodiments, further including the base station, wherein the base station comprises a radio interface configured to communicate with the UE and a communication interface configured to forward to the host computer the user data carried by a transmission from the UE to the base station.

60. The communication system of the previous 3 embodiments, wherein: the processing circuitry of the host computer is configured to execute a host application; and the UE's processing circuitry is configured to execute a client application associated with the host application, thereby providing the user data.

61. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

62. A method implemented in a communication system including a host computer, a base station and a UE the method comprising: at the host computer, receiving user data transmitted to the base station from the UE, wherein the UE performs any of the steps of any of the Group A embodiments.

63. The method of the previous embodiment, further comprising, at the UE, providing the user data to the base station.

64. The method of the previous 2 embodiments, further comprising: at the UE, executing a client application, thereby providing the user data to be transmitted; and at the host computer, executing a host application associated with the client application.

65. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

66. A communication system including a host computer comprising a communication interface configured to receive user data originating from a transmission from a UE to a base station, wherein the base station comprises a radio interface and processing circuitry, the base station's processing circuitry configured to perform any of the steps of any of the Group B embodiments.

67. The communication system of the previous embodiment further including the base station.

68. The communication system of the previous 2 embodiments, further including the UE, wherein the UE is configured to communicate with the base station.

69. The communication system of the previous 3 embodiments, wherein: the processing circuitry of the host computer is configured to execute a host application; the UE is configured to execute a client application associated with the host application, thereby providing the user data to be received by the host computer.

70. A method implemented in a communication system including a host computer, a base station and a UE the method comprising: at the host computer, receiving, from the base station, user data originating from a transmission which the base station has received from the UE, wherein the UE performs any of the steps of any of the Group A embodiments.

71. The method of the previous embodiment, further comprising at the base station, receiving the user data from the UE.

72. The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 2G | Second Generation |
| 3G | Third Generation |
| 3GPP | Third Generation Partnership Project |
| 4G | Fourth Generation |
| 5G | Fifth Generation |
| AC | Alternating Current |
| AFC | Automatic Frequency Control |
| AGC | Automatic Gain Control |
| AM | Amplitude Modulation |
| AO | Active Occasion |
| AP | Access Point |
| ASIC | Application Specific Integrated Circuit |
| ATM | Asynchronous Transfer Mode |
| BLER | Block Error Rate |
| BS | Base Station |
| BSC | Base Station Controller |
| BTS | Base Transceiver Station |
| BW | Bandwidth |
| CD | Cool Down |
| CDMA | Code Division Multiple Access |
| CE | Coverage Enhancement |
| COTS | Commercial Off-the-Shelf |
| CPE | Customer Premise Equipment |
| CPU | Central Processing Unit |
| CQI | Channel Quality Information |
| CRS | Cell-specific Reference Signal |
| CSI | Channel State Information |
| CSI-RS | Channel State Information Reference Signal |
| D2D | Device-to-Device |
| DAS | Distributed Antenna System |
| dB | Decibels |
| dBm | Decibel-Milliwatts |

| | |
|---|---|
| DC | Direct Current |
| DCCH | Dedicated Control Channel |
| DIMM | Dual In-Line Memory Module |
| DL | Downlink |
| DMRS | Demodulation Reference Signal |
| DRS | Discovery Reference Signal |
| DRX | Discontinuous Reception |
| DSP | Digital Signal Processor |
| DVD | Digital Video Disc |
| eDRX | Enhanced Discontinuous Reception |
| EEPROM | Electrically Erasable Programmable Read Only Memory |
| eMTC | Enhanced Machine-Type Communication |
| eNB | Enhanced or Evolved Node B |
| ePDCCH | Enhanced Physical Downlink Control Channel |
| EPROM | Erasable Programmable Read Only Memory |
| Ês | Received Energy per resource element |
| E-SMLC | Evolved Serving Mobile Location Center |
| E-UTRA | Evolved Universal Terrestrial Radio Access |
| E-UTRAN | Evolved Universal Terrestrial Radio Access Network |
| FL1 | Frequency Location 1 |
| FL2 | Frequency Location 2 |
| FPGA | Field Programmable Gate Array |
| GHz | Gigahertz |
| gNB | New Radio Node B |
| GPS | Global Positioning System |
| GSM | Global System for Mobile Communications |
| HARQ | Hybrid Automatic Repeat Request |
| HDDS | Holographic Digital Data Storage |
| HD-DVD | High-Density Digital Versatile Disc |
| I/O | Input and Output |
| ID | Identity/Identifier |
| IoT | Internet of Things |
| Iot | Received power spectral density of the total noise and interference |
| IP | Internet Protocol |
| LAN | Local Area Network |
| LEE | Laptop Embedded Equipment |
| LME | Laptop Mounted Equipment |
| LTE | Long Term Evolution |
| M2M | Machine-to-Machine |
| MAC | Medium Access Control |
| MANO | Management and Orchestration |
| MBSFN | Multimedia Broadcast Multicast Service Single Frequency Network |
| MCE | Multi-Cell/Multicast Coordination Entity |
| MCG | Master Cell Group |
| MDT | Minimization of Drive Tests |
| MeNB | Master evolved Node B |
| MHz | Megahertz |
| MIMO | Multiple Input Multiple Output |
| MME | Mobility Management Entity |
| MMEC | Mobility Management Entity Code |
| MMEGI | Mobility Management Entity Group Identifier |
| MPDCCH | Machine Type Communication Physical Downlink Control Channel |
| ms | Milliseconds |
| MSC | Mobile Switching Center |
| MSR | Multi-Standard Radio |
| MTC | Machine-Type Communication |
| NB | Narrowband |
| NB-IoT | Narrowband Internet of Things |
| NFV | Network Function Virtualization |
| NIC | Network Interface Controller |
| NPDCCH | Narrowband Physical Downlink Control Channel |
| NR | New Radio |
| O&M | Operation and Maintenance |
| OSS | Operations Support System |
| OTT | Over-the-Top |
| PCell | Primary Cell |
| PDA | Personal Digital Assistant |
| PDCCH | Physical Downlink Control Channel |
| PDN | Packet Data Network |
| PDSCH | Physical Downlink Shared Channel |
| PLMN | Public Land Mobile Network |
| PRB | Physical Resource Block |
| PROM | Programmable Read Only Memory |
| PSCell | Primary/Secondary Cell |
| PSTN | Public Switched Telephone Networks |
| PTW | Paging Transmission Window |
| PUSCH | Physical Uplink Shared Channel |
| RA | Random Access |
| RACH | Random Access Channel |
| RAID | Redundant Array of Independent Disks |
| RAM | Random Access Memory |
| RAN | Radio Access Network |
| RAT | Radio Access Technology |
| RB | Resource Block |
| RE | Resource Element |
| RF | Radio Frequency |
| RLC | Radio Link Control |
| RLM | Radio Link Management |
| RNC | Radio Network Controller |
| ROM | Read Only Memory |
| RP | Received Power |
| RRC | Radio Resource Control |
| RRH | Remote Radio Head |
| RRU | Remote Radio Unit |
| RS | Reference Signal |
| RSRP | Reference Symbol Received Power/Reference Signal Received Power |
| RSRQ | Reference Symbol Received Quality/Reference Signal Received Quality |
| RSTD | Reference Signal Time Difference |
| RTT | Round Trip Time |
| RUIM | Removable User Identity |
| SAC | Supplementary Activity Configuration |
| SAE | System Architecture Evolution |
| SAP | Service Access Point |
| SCell | Secondary Cell |
| SCG | Secondary Cell Group |
| SCH | Synchronization Channel |
| SCH_RP | Synchronization Channel Received Power |
| SDRAM | Synchronous Dynamic Random Access Memory |
| SeNB | Secondary evolved Node B |
| SF | Subframe |
| SI | System Information |
| SIB | System Information Block |
| SIM | Subscriber Identity Module |
| SINR | Signal to Interference plus Noise Ratio |
| SNR | Signal to Noise Ratio |
| SOC | System on a Chip |
| SON | Self-Organizing Network |
| SONET | Synchronous Optical Networking |
| SPS | Semi-Persistent Scheduling |
| SRB | Signaling Radio Bearer |
| SS | Synchronization Signal |
| S-TMSI | System Architecture Evolution Temporary Mobile Subscriber Identity |
| sTTI | Shortened Transmission Time Interval |
| TCP | Transmission Control Protocol |
| TMSI | Temporary Mobile Subscriber Identity |
| TTI | Transmission Time Interval |
| Tx | Transmit |
| UE | User Equipment |
| UL | Uplink |
| UMTS | Universal Mobile Telecommunications System |
| USB | Universal Serial Bus |
| UTRA | Universal Terrestrial Radio Access |
| UTRAN | Universal Terrestrial Radio Access Network |
| V2I | Vehicle-to-Infrastructure |
| V2V | Vehicle-to-Vehicle |
| V2X | Vehicle-to-Everything |
| VMM | Virtual Machine Monitor |
| VNE | Virtual Network Element |
| VNF | Virtual Network Function |
| VoIP | Voice over Internet Protocol |
| WAN | Wide Area Network |
| WCDMA | Wideband Code Division Multiple Access |
| WD | Wireless Device |
| WiMax | Worldwide Interoperability for Microwave Access |
| WLAN | Wireless Local Area Network |
| WU | Warm Up |

Those skilled in the art will recognize improvements and modifications to the embodiments of the present disclosure. All such improvements and modifications are considered within the scope of the concepts disclosed herein.

What is claimed is:

1. A method performed by a wireless device for lean carrier operation during which Cell-specific Reference Signals (CRSs) are transmitted by a base station using a reduced bandwidth during an inactive time of a Discontinuous Reception (DRX) mode of operation excluding a Warm Up (WU) period that occurs immediately before a DRX active time and a Cool Down (CD) period that occurs immediately after the DRX active time, the method comprising:
   determining a number M of subframes to comprise the WU period;
   determining a number N of subframes to comprise the CD period; and
   transmitting an indication of the determined numbers M and N to the base station currently serving the wireless device,
   wherein transmitting the determined numbers M and N comprises:
      transmitting information that defines or identifies a previously defined Supplementary Activity Configuration (SAC) which specifies values for the numbers M and N, wherein the SAC specifies a bandwidth or set of frequency resources used during lean carrier operation and a set of symbols or resource elements within a resource block comprised in WU and/or CD subframes, wherein the SAC identifies one or more operations of the wireless device for which the SAC is needed, and
   wherein the method further comprises receiving, by the wireless device, an indication of a number K indicating a number of subframes comprising the WU period and a number L indicating a number of subframes comprising the CD period, wherein the number K is same as or different from the number M and wherein the number L is same as or different from the number N, and wherein receiving the indication of the numbers K and L comprises:
      receiving information that defines or identifies a previously defined SAC which specifies values for the numbers K and L, or
      receiving the numbers K and L.

2. The method of claim 1, wherein the number M and/or N is determined based at least in part on one or more criteria for operation of the wireless device during the lean carrier operation, the criteria comprising:
   a coverage enhancement level of the wireless device;
   a battery life of the wireless device;
   a required signal quality at the wireless device;
   a required target quality at the wireless device;
   a bandwidth of a CRS during a reduced bandwidth transmission;
   a bandwidth of the CRS during a non-reduced bandwidth transmission;
   and/or a DRX cycle configuration.

3. The method of claim 1, wherein transmitting the indication of the determined numbers M and N comprises:
   transmitting the numbers M and N, and/or
   transmitting a value delta M indicating a difference between the number M and a number of WU subframes currently used by the wireless device and transmitting a value delta N indicating a difference between the number N and a number of CD subframes currently used by the wireless device.

4. The method of claim 1, wherein receiving the indication of the numbers K and L comprises receiving a value deltaK indicating a difference between the number K and the number of WU subframes currently used by the wireless device and transmitting a value deltaL indicating a difference between the number L and the number of CD subframes currently used by the wireless device.

5. The method of claim 1, wherein the indication of the numbers K and L is received from the base station currently serving the wireless device and/or a base station other than the base station currently serving the wireless device and/or a base station of a cell that is a candidate target for handover of the wireless device.

6. A method performed by a base station for lean carrier operation during which Cell-specific Reference Signals (CRSs) of a cell are transmitted by the base station using a reduced bandwidth during an inactive time of a Discontinuous Reception (DRX) mode of operation of a wireless device excluding a Warm Up (WU) period that occurs immediately before a DRX active time and a Cool Down (CD) period that occurs immediately after the DRX active time, the method comprising:
   determining a number K of subframes to comprise the WU period;
   determining a number L of subframes to comprise the CD period; and
   transmitting an indication of the determined numbers K and L to another node,
   wherein the number K and/or L is determined based at least in part on an indication of numbers M and/or N, respectively, received from the wireless device, wherein the number M indicates a number of subframes to comprise the WU period and the number N indicates a number of subframes to comprise the CD period,
   wherein the received indication of the numbers M and N comprises received values for the numbers M and N and/or information that defines or identifies a previously defined Supplementary Activity Configuration (SAC) which specifies values for the numbers M and N, and wherein the number K is set to the value of the number M and the number L is set to the value of the number N, and
   wherein the numbers K and L are determined by applying an operation on the values of the numbers M and N, respectively, or based at least in part on a plurality of values of the numbers M and N, respectively, received from a plurality of wireless devices in the same cell, or based at least in part on an activity state of at least one wireless device in the cell.

7. The method of claim 6, further comprising:
   configuring the number K of WU subframes and/or the number L of CD subframes in the cell, and/or
   adapting a DRX configuration based at least in part on values of the number K and/or L, and/or
   adapting scheduling of uplink and/or downlink signals to the wireless device.

8. The method of claim 6, wherein transmitting the indication of the determined numbers K and L to another node comprises transmitting the indication to the wireless device and/or transmitting the indication to another base station.

9. The method of claim 6, wherein the number K and/or L is determined based at least in part on one or more characteristics of the cell, the one or more characteristics comprising:
   a transmit power of the base station or wireless device;
   available or unused subframes;
   interference at the wireless device in the cell;
   received signal quality measurement results from the wireless device;
   transmit power used in a neighboring cell; and/or
   cell-to-cell interference.

10. The method of claim 6, wherein the number K and/or L is determined based on information received by the base station from another base station currently serving a wireless device that is a candidate for handover, wherein a handover decision is based at least in part on the determined number K and/or L.

11. The method of claim 10, wherein a composite value K' is determined based on the number K and a value of the number M indicated by the wireless device and wherein a composite value L' is determined based on the number L and a value of the number N indicated by the wireless device.

12. The method of claim 6, further comprising:
determining the number K and L based at least in part on the plurality of values of the numbers M and N, respectively, received from a plurality of wireless devices in the same cell and determining a common Supplementary Activity Configuration (SAC) that accommodates reference signals to be used by the plurality of wireless devices.

13. The method of claim 12, wherein determining the common SAC comprises performing a function on a plurality of SACs for a same or similar wireless device operation or having overlapping time and/or frequency resources.

14. A wireless device for lean carrier operation during which Cell-specific Reference Signals (CRSs) are transmitted by a base station using a reduced bandwidth during an inactive time of a Discontinuous Reception (DRX) mode of operation excluding a Warm Up (WU) period that occurs immediately before a DRX active time and a Cool Down (CD) period that occurs immediately after the DRX active time, the wireless device comprising:
processing circuitry configured to perform:
determining a number M of subframes to comprise the WU period;
determining a number N of subframes to comprise the CD period;
and
transmitting an indication of the determined numbers M and N to the base station currently serving the wireless device; and
power supply circuitry configured to supply power to the wireless device
wherein transmitting the indication of the determined numbers M and N comprises:
transmitting information that defines or identifies a previously defined Supplementary Activity Configuration (SAC) which specifies values for the numbers M and N, wherein the SAC specifies a bandwidth or set of frequency resources used during lean carrier operation and a set of symbols or resource elements within a resource block comprised in WU and/or CD subframes, wherein the SAC identifies one or more operations of the wireless device for which the SAC is needed, and
wherein the method further comprises receiving, by the wireless device, an indication of a number K indicating a number of subframes comprising the WU period and a number L indicating a number of subframes comprising the CD period, wherein the number K is same as or different from the number M and wherein the number L is same as or different from the number N, and wherein receiving the indication of the numbers K and L comprises:
receiving information that defines or identifies a previously defined SAC which specifies values for the numbers K and L, or
receiving the numbers K and L.

15. A base station for lean carrier operation during which Cell-specific Reference Signals (CRSs) of a cell are transmitted by the base station using a reduced bandwidth during an inactive time of a Discontinuous Reception (DRX) mode of operation of a wireless device a Warm Up (WU) period that occurs immediately before a DRX active time and a Cool Down (CD) period that occurs immediately after the DRX active time, the base station comprising:
processing circuitry configured to perform:
determining a number K of subframes to comprise the WU period;
determining a number L of subframes to comprise the CD period; and
transmitting an indication of the determined numbers K and L to another node; and
power supply circuitry configured to supply power to the wireless device,
wherein the number K and/or L is determined based at least in part on an indication of numbers M and/or N, respectively, received from the wireless device, wherein the number M indicates a number of subframes to comprise the WU period and the number N indicates a number of subframes to comprise the CD period,
wherein the received indication of the numbers M and N comprises received values for the numbers M and N and/or information that defines or identifies a previously defined Supplementary Activity Configuration (SAC) which specifies values for the numbers M and N, and wherein the number K is set to the value of the number M and the number L is set to the value of the number N, and
wherein the numbers K and L are determined by applying an operation on the values of the numbers M and N, respectively, or based at least in part on a plurality of values of the numbers M and N, respectively, received from a plurality of wireless devices in the same cell, or based at least in part on an activity state of at least one wireless device in the cell.

* * * * *